US011475709B2

(12) United States Patent
Lafreniere et al.

(10) Patent No.: US 11,475,709 B2
(45) Date of Patent: Oct. 18, 2022

(54) SYSTEMS, METHODS, AND PLATFORM FOR FACIAL IDENTIFICATION WITHIN PHOTOGRAPHS

(71) Applicants: Tina Elizabeth Lafreniere, Naples, FL (US); John William Lafreniere, Naples, FL (US); Grace Elizabeth Lafreniere, Austin, TX (US)

(72) Inventors: Tina Elizabeth Lafreniere, Naples, FL (US); John William Lafreniere, Naples, FL (US); Grace Elizabeth Lafreniere, Austin, TX (US)

( * ) Notice: Subject to any disclaimer, the term of this patent is extended or adjusted under 35 U.S.C. 154(b) by 41 days.

(21) Appl. No.: 17/216,344

(22) Filed: Mar. 29, 2021

(65) Prior Publication Data

US 2021/0303828 A1 Sep. 30, 2021

Related U.S. Application Data

(60) Provisional application No. 63/001,654, filed on Mar. 30, 2020.

(51) Int. Cl.
*G06K 9/62* (2022.01)
*G06K 9/36* (2006.01)
*G06V 40/16* (2022.01)

(52) U.S. Cl.
CPC .......... *G06V 40/172* (2022.01); *G06V 40/169* (2022.01)

(58) Field of Classification Search
CPC .............. G06V 40/178; G06V 40/172; G06V 40/16–40/179; G06F 16/24–16/248; G06F 16/907–16/909; G06F 16/58–16/587; G06F 16/164–16/168
See application file for complete search history.

(56) References Cited

U.S. PATENT DOCUMENTS

| | | | |
|---|---|---|---|
| 8,180,112 B2 | 5/2012 | Kurtz et al. | |
| 8,503,739 B2 * | 8/2013 | Bourdev ............ | G06V 40/171 |
| | | | 382/118 |
| 8,837,787 B2 | 9/2014 | Brookhart | |
| 8,897,505 B2 | 11/2014 | Gokturk et al. | |
| 8,959,092 B2 | 2/2015 | Sparrow et al. | |
| 9,030,502 B2 | 5/2015 | Brookhart | |
| 9,141,644 B2 | 9/2015 | Steiner | |
| 9,325,783 B2 | 4/2016 | Arfvidsson et al. | |
| 9,465,813 B1 | 10/2016 | Li et al. | |
| 9,773,156 B2 | 9/2017 | Chan et al. | |
| 10,140,552 B2 | 11/2018 | Steiner | |

(Continued)

OTHER PUBLICATIONS

"What are Photo Discoveries™?" Accessed online Mar. 29, 2021 <https://www.myheritage.com/help-center/en/article/what-are-photo-discoveries>.

(Continued)

*Primary Examiner* — Brian Werner
(74) *Attorney, Agent, or Firm* — Gardella Grace P.A.

(57) ABSTRACT

In an illustrative embodiment, systems and methods for assisting users in identifying unknown individuals in photographs first apply facial recognition to obtain a first likelihood of match between a target face and other faces in a corpus of images provided by users of a genealogy platform, and then adjusts the first likelihood of match according to similarities and dissimilarities in attributes supplied by users regarding individuals represented by each face. Resultant likelihoods drive presentation of potential matches for consideration by a requesting user.

13 Claims, 9 Drawing Sheets

(56) References Cited

U.S. PATENT DOCUMENTS

| | | |
|---|---|---|
| 10,175,936 B2 | 1/2019 | Yang et al. |
| 10,198,629 B2 | 2/2019 | Segalovitz et al. |
| 10,296,811 B2 | 5/2019 | Krupka et al. |
| 10,607,062 B2 | 3/2020 | Chan et al. |
| 10,909,428 B2 | 2/2021 | Kim et al. |
| 2005/0196021 A1* | 9/2005 | Seto ............... G06V 40/16 382/118 |
| 2009/0016576 A1* | 1/2009 | Goh ............... G06F 16/5838 707/E17.023 |
| 2009/0196493 A1* | 8/2009 | Widrow ............... G06K 9/6247 707/999.005 |
| 2010/0014721 A1* | 1/2010 | Steinberg ............... G06F 16/583 382/118 |
| 2018/0157458 A1 | 6/2018 | Yang et al. |
| 2019/0156695 A1 | 5/2019 | Hwang et al. |

OTHER PUBLICATIONS

Xia et al., "Understanding Kin Relationships in a Photo," IEEE Transactions on Multimedia, Aug. 2012, 14(4):1046-1056.

Rasmus, "COSC460: Improving Face Recognition with Genealogical and Contextual Data," IVCNZ '12: Proceedings of the 27th Conference on Image and Vision Computing New Zealand, Nov. 2, 2012, 37 pages.

* cited by examiner

SYSTEMS, METHODS, AND PLATFORM FOR FACIAL IDENTIFICATION WITHIN PHOTOGRAPHS

RELATED APPLICATIONS

This application claims priority to U.S. Provisional Patent Application Ser. No. 63/001,654, entitled "Systems, Methods, and Platform for Facial Identification within Photographs," filed Mar. 30, 2020.

BACKGROUND

People around the world have photographs of people whom they do not recognize. Many of these photographs are family heirlooms. Individuals must choose to keep or discard these photographs.

How can individuals discover the identity of the unknown faces in the photographs?

Are there other people or resources in the world who either know who the faces are, or can help to discover the identity of the faces?

Timeliness is an issue as people who have the knowledge of who is in the photographs are aging and passing.

People with photos containing images of unidentified persons are currently using human vision and analysis for identifying faces in photos.

Some individuals are enlisting the assistance of others by utilizing social media with pages dedicated to the posting of old photos. The followers of these pages generally have a connecting element such as their families may have originated from the same place. Users rely on human vision and memory for assistance with facial identification.

Relevance and timeliness are also an issue with social media solutions because, as more photos are loaded on to the page, earlier photos are pushed down the page and become forgotten.

SUMMARY OF ILLUSTRATIVE EMBODIMENTS

This disclosure relates to methods, algorithms, and a graphic user interface platform which leverages facial recognition technology to compare individuals in photographs and build profiles based on those faces to assist users in determining the identity of unknown faces in their photo collections. Preferred embodiments of the methods, algorithms, and platform described herein are geared toward genealogy, but the teachings are not limited to genealogy. In some embodiments, the methods, algorithms, and platform also provide a format for users to collaborate and communicate to solve the problem of unknown faces in photos.

The Face Relating Process is a platform and software tool incorporating methods to assist users in identifying people in their photographs. The software automates the facial identification process by utilizing facial recognition technology, and enhances, modifies, and improves the information currently provided by facial recognition systems. The inventors created the Face Relating Process to be a tool for genealogists both professional and hobbyists. It was not the inventors' intent for the methods, algorithms, and platform described herein to be used for law enforcement purposes.

In some embodiments, users upload their photos via mobile application or website upload and provide known metadata about the photo as described in greater detail below. The user may name the photo. When the user submits the photo, a unique identifier is created connecting the user, photo metadata and photo image together. The image is then supplied to one or more facial recognition algorithms (e.g., customized and/or provided by a third-party facial recognition technology service) for facial mapping and identification.

In some embodiments, the identifiable faces are then presented to the user. For example, the photo may be presented to the user with all identifiable faces highlighted or visibly marked in relation to the remainder of the photos (e.g., isolated in boxes). The user may be prompted to provide information about each face presented. The user may or may not have identifying metadata on each face isolated in the photograph. All metadata provided by the user is uniquely stored in a non-transitory computer readable data store, such as the A database.

Each photograph and/or each isolated face, in some embodiments, is additionally assigned a unique identifier. The identifying information from the facial recognition process may be attached to that identifier. The identifying information, in some examples, can include attributes such as gender, age range, facial hair, and glasses. The identifying information, further, can include facial feature mappings.

After the identifying information is received from the one or more facial recognition algorithms, in some embodiments, the information is compared against other faces in the database. The faces, for example, may be compared to all other faces. In other embodiments, the faces may be compared to a subset of the faces, for example based upon a gender.

In some embodiments, The Facial Pairing Process assigns a similarity score to each face that is compared to the newly loaded facial image. The similarity score, for example, may be represented as a percentage similarity between the new facial image and each other face. A pairing may be identified within different photos provided to the platform by a same user and/or pairing(s) may be identified with a face in a photo of one or more other users and/or archives.

When a possible match is identified, in some embodiments, the Facial Pairing Process utilizes the data provided by users to enhance the probability, or possibility, of a facial match by considering any personal identifying metadata provided by users. This process, for example, may be used to increase or decrease the similarity score, thereby increasing or decreasing an assigned probability of a match. The metadata, in some examples, may include age, geographic region, first name, last name(s), nickname(s), gender, date of death (where applicable), race, hair color, eye color, hair type (e.g., straight, wavy, curly, etc.) and/or unique identifying features (e.g., tattoo, piercing, mole, freckles, birthmark, scar, etc.). User supplied metadata, in some implementations, may be compared to attributes identified by the one or more facial recognition algorithms, such as gender. In other implementations, user supplied metadata is compared to metadata submitted by other users.

In some embodiments, the pairings are then presented to the users who uploaded the photos for final assessment and active matching through the Facial Pairing and Matching Processes. User acceptance or rejection of the pairings may further enhance the process by adding a human checking element. The Face Relating Process, in some implementations, connects users whose photos contain faces of persons the process indicates may be the same person. In some implementations, the Face Relating Process identifies members of a same family, for example if the family has strong hereditary features.

The sharing of information, and confirmation of information by users, in some embodiments, adds to the ability of the Face Relating Process to learn the evolution of a person's face thoughout their life. This form of user involvement is therefore specialized and targeted, and not left for random strangers to voice opinions as would be done in a crowd sourcing scenario. The persons interacting are more likely to have a connection and a mutual goal.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
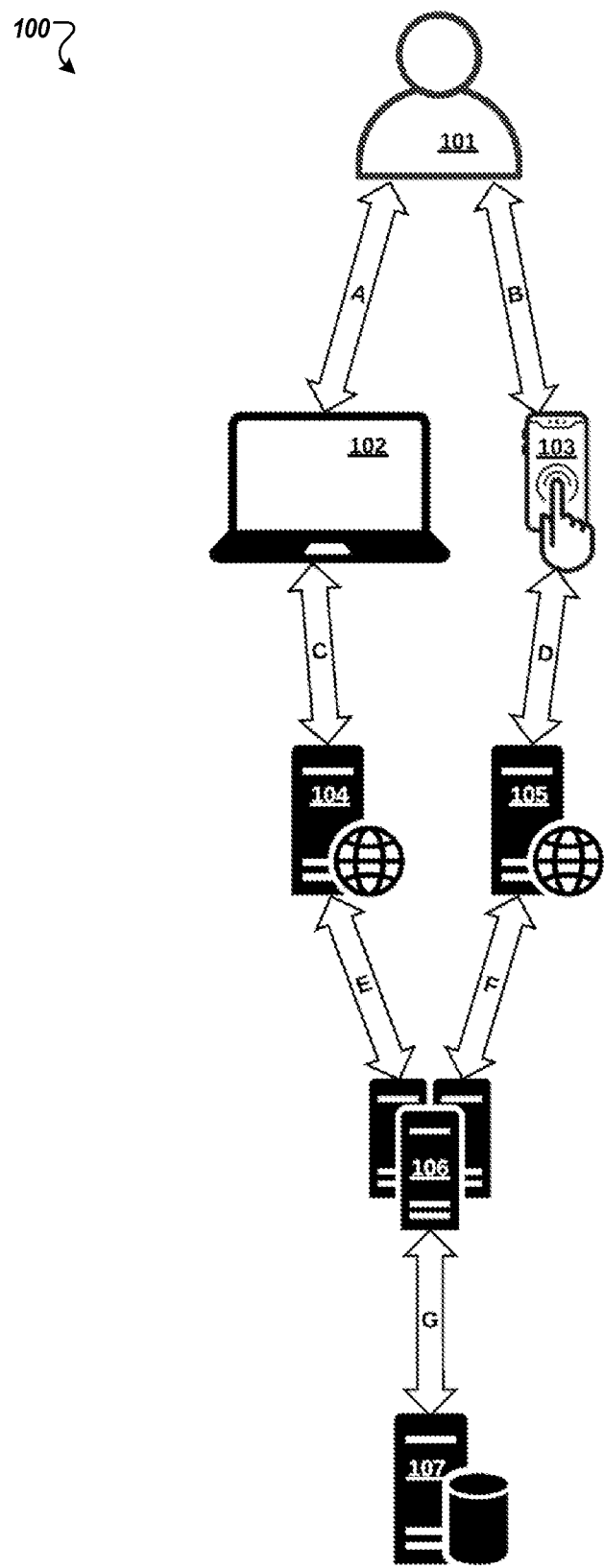
FIG. 1 is a flow diagram of an example photo submission process.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a." "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom." "front," "rear," "side," "height," "length," "width." "upper," "lower." "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

In some embodiments, a platform provides software tools incorporating methods to assist users in identifying people in their photographs. Turning to FIG. 6, the platform may include a master process flow 600 designed to call into individual software tools and/or routines, described in relation to FIG. 1 through FIG. 5A, by providing metadata and other information to the software tools and/or routines. Additionally, files, data, metadata, and other information collected by the platform may be collected by an artificial intelligence (AI) data collection and processing engine 608 for continuous learning and refinement of the various software tools and/or routines.

In some implementations, the master process flow 600 begins with obtaining a digital photograph (601). The digital photograph, for example, may be submitted by a user or accessed from a digital photo archive. In some embodiments, the photo is obtained as described in relation to a process 100 of FIG. 1.

Turning to FIG. 1, in some implementations, a photo submission process 100 allows a user 101 to interface with mobile application service 105, application servers 106, and/or database servers 107 of a platform configured to apply facial recognition technology to compare individuals in photographs and build profiles based on those faces. To utilize the platform and its associated products and services, the user 101 may upload digital photographs either with a mobile application launched on the mobile device 103 or a website widget launched on a personal computing device 102 such as a laptop computer.

Whereas many old photographs may be ruined if exposed to intense light, as with scanners, the mobile application enables users to safely digitize their old photographs via a mobile device 103, and the application may provide clear instructions and a user-friendly interface. In some embodiments, mobile devices may also provide better resolution than scanners.

After user 101 downloads the application from the mobile application service 105 (e.g., server, distribution platform, etc.) to their mobile device 103 and either creates an account or logs in to an existing account with their credentials, the application steps users through a process for digitizing their old physical photographs and allows them to accept or reject the image if they are unhappy with the quality of the image captured by the mobile application and/or mobile device 103.

In some embodiments, user 101 may already have images on their mobile device 103 they wish to load to the platform. Features within the mobile application may assist user 101 with loading those images to the mobile application service 105. Loaded images may be stored in the database server(s) 107. User 101 may reject images which are unsuitable or mistakenly selected and return to the beginning of the process to start anew. The photograph and any associated data, such as an image name, may be permanently deleted (e.g., from the database server(s) 107).

In some embodiments, photographs loaded from mobile device 103 may receive the same treatments and enhancements as those loaded from a computer 102 to the platform. These treatments and enhancements are explained below. Photographs loaded from the mobile application may be stored in a mobile uploads folder in the database server(s) 107 or another storage region associated with the user's account until the user 101 chooses to move them or otherwise address them.

In some embodiments, the mobile application allows images taken by the user 101 to be stored on the user's mobile device 103.

Users may load images stored on a computing device, such as a laptop computer. The website platform, in some embodiments, enables the user 101 to drag and drop an image into a photo loading widget, or browse the computer 102 for an image to load into the widget. If the user 101 mistakenly selects the wrong photo, or a photo is of poor quality, the user 101 may be given the ability to reject the image and start anew. Rejected images, in some implementations, are not entered into the database server(s) 107 and may be permanently deleted.

In some embodiments, the process for uniquely identifying photos and faces, entering metadata, facial mapping and enhancements, and storage for either photos loaded by mobile application or a website widget, including the process 100, may be essentially the same regardless of device or user platform, with exceptions for page appearance (e.g., sizing to fit available screen area, content placement on available screen, font and content size, and other visualizations which do not affect the process) and other minor differences related to the variation in devices.

In some embodiments, when user 101 uploads a photo via mobile app or website widget the platform applies a Unique Photo Identifier (UPI) to the photo which associates the photo to the user 101. The UPI may be placed in the user's photo name metadata field as a default photo name, for example. The user 101 may edit this name field, but this action, in some implementations, does not alter the UPI, it only changes the user's specific photo name. Furthermore, the UPI may be, but is not limited to, a series of numbers, letters and/or symbols.

In some embodiments, additional metadata fields provided to user 101 may default to empty/blank and user 101 may add or edit metadata as desired, described in greater detail below. After user 101 has entered desired metadata and/or otherwise "accepted" the photo, the photo is placed in a folder associated with the user 101 (e.g., default folder). In some implementations, mobile uploaded photos default into a "mobile upload" folder and website uploaded photos default into a "photos" folder, tab and/or page. Users may be provided the option to change folders and/or create new folders.

A user's "acceptance" of a photo may submit the photo for processing and facial isolation and mapping by the facial mapping process, as described in further detail below.

In some embodiments, the user 101 is provided the opportunity to upload multiple photos in bulk. Large volume uploads may use a file upload process. Files may be uploaded with many photos. Each image may be parsed based on a predetermined mapping or template. These templates and mapping instructions may contain key metadata such as, but not limited to, photo source, photo name, dates and other details associated with each of the photos. Photos containing many people and names may be further processed to associate each of the faces to one of the names provided by the source. The UPI process described above may also be implemented for all bulk uploaded photos. Photos uploaded in bulk may receive the same treatment as non-bulk loaded photos as to other processes described herein.

Returning to FIG. 6, in some implementations, photo metadata is obtained (602). In one example, a portion of the metadata may be included in the digital photograph file structure. In another example, when a user accepts upload of a digital photo (e.g., the user clicks on an "acceptance" button), the selected image may load into the platform data store (e.g., database), and the user is then enabled to provide known metadata. Metadata may include, but is not limited to, photo name, place original photo may have been taken, name of original photo's photographer or photography studio, and the date the original photograph may have been taken or an approximation thereof.

In some embodiments, the user may not know the date the original photo was taken but may have an approximation (e.g., guess) of the year. In these cases, the user may enter an estimated year (Guess Year) the Photo was taken and then select a Plus or Minus Years Estimator (+/−YE). This will generate a range of years when the Photo may have been taken based on the range selected by the user. (For example, a user estimates the Photo may have been taken in 1900 but is uncertain. The user may indicate a range, such as plus or minus three years. This will generate a Date Range when the photo may have been taken of 1897 to 1903.) The process may or may not restrict the Year Estimator to be in whole numbers, and may, or may not, restrict the estimated date range, such as to 3, 5 or 10 years (Y) for example.

Whereas users may be unaware or mistaken about metadata associated with a photograph at the time of submission, the platform may allow users to confirm the information they provided by selecting "Accept", but not permanently bind them to the information provided. Users may be allowed to edit the metadata at a later time. The metadata, for example, may be collected in the data store or database and associated with the digital photo.

In some implementations, when a user "accepts" a photo, the process assigns a Unique Photo Identifier (UPI) to the photograph. The UPI, for example, may be used to associate the user who submitted the photo with the photo and any associated photo metadata. The UPI may be visible to the user.

Concurrent with a user's acceptance of a photographic image, in some embodiments, the image is forwarded to a facial mapping process 200 where identifiable faces within the photo may be isolated and mapped.

Figure 2:
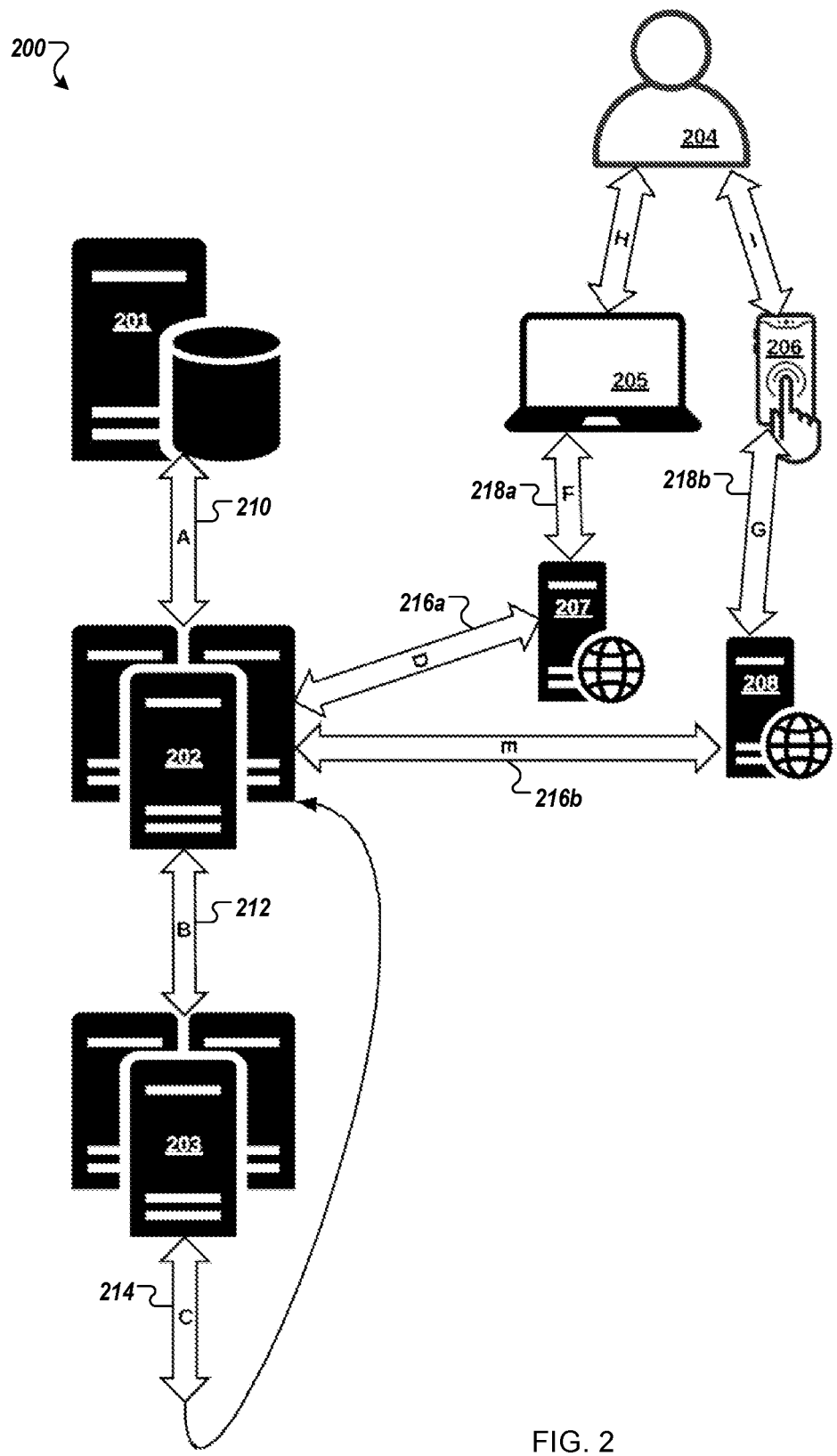
FIG. 2 is a flow diagram of an example facial pairing process.

Turning to FIG. 2, in some embodiments, a facial mapping service 202 (e.g., one or more software applications, routines, algorithms, etc.) of a facial mapping process 200 obtains a digital photo (210) from a data storage service 201 (e.g., database server, data lake, etc.). The photo, for example, may have been committed to the data storage service 201 by a user 204 accepting upload of the photo.

In some embodiments, a unique identifier is assigned to each photo (FRS UPI). For example, the photo may be provided (212) to a facial recognition service (FRS) 203 (e.g., one or more software applications, routines, algorithms, etc.) for creation of the FRS UPI. The FRS UPI may be associated with the photo, user, and any metadata in the storage/database by the FRS. The association of the platform UPI and/or FRS UPI, photo and any associated metadata, in some implementations, is permanent.

In some embodiments, the FRS 203 identifies and isolates the faces within a photo and provides this information to the platform along with assigning a unique facial identifier (UFI) (214) to any isolated face(s) in the photo. Faces not clear enough to be analyzed may not be isolated. Faces that are not isolated may not be given a UFI. The platform may, or may not, apply its own UFI to the identified/isolated Face(s). Faces not clear enough to be analyzed and isolated by the facial mapping process may not be given a UFI by the platform. The UFI may be, but is not limited to, a series of numbers, letters and/or symbols. This process allows each Face to become an independent image with unique features and metadata. In some implementations, detailed facial attributes are provided to the database and the platform stores those attributes with the associated UFI(s).

In some embodiments, these attributes may be analyzed and compared as part of creating facial pairings. Faces may receive analytical treatments such as, but not limited to, gender and/or skin tone. These treatments may enhance the accuracy and speed of the pairing process (e.g., the accuracy and speed of a search may be enhanced by isolating a specific gender). If the gender of a face is known to be female, for example, the search may be improved by excluding some, or all, males from the search. Facial pairing is described in further detail below in relation to FIG. 3.

As illustrated in FIG. 6, in some implementations, isolated faces of individuals are presented to the user for adding facial metadata (603). Returning to FIG. 2, in some implementations, an augmented image of the original photo is provided to the user device (e.g., mobile phone 206 or computing device 205) via the mobile application server 208 or web server 207 for presentation to the user 204 for review of the isolated faces (216a, 218a or 216b, 218b). For example, the augmented image may highlight the isolated faces with shapes and/or colors in a master photo view shown to the user 204. These shapes may be, but are not limited to, squares, rectangles, or circles, for example. The shapes may be hollowed or may be fully shaded. The color of the lines and/or shapes could be any color in the visible color spectrum.

In some implementations, the user 204 interacts with the augmented image to provide metadata associated with one or more of the isolated faces. Faces with metadata may become a profile for a person. In some embodiments, user 204 may choose to assign a face to an existing profile where it will inherit the metadata of the existing profile. Metadata fields may be presented to user 204 in several forms including, but not limited to, empty field, dropdown menu, plus or minus range menu, multiple choice menu, and/or menu, yes/no menu. The metadata information user 204 may enter may include, but is not limited to, First Name, Middle Name, Last Name, Alternate/Other Name, Birth Date with or without+/−Year Estimator Birthplace, Death Date with or without +/−Year Estimator, Death Place, Biological Gender: Male, Female, Unknown, Living Status: Living, Deceased, Unknown, and Military Service: Yes, No, Unknown.

The platform may automatically select one of the faces from the user's photo for the addition of metadata for a target face. In some instances, the user 204 may opt to select a different face from the one which has been targeted. Users may select any augmented face for metadata addition.

When available, the platform may recommend metadata previously entered by that user (e.g., person name, place, gender). The user 204 may accept the recommendation, ignore the recommendation, or replace it with other metadata.

To protect the privacy of living persons, the metadata entry process, in some embodiments, requires the user 204 to identify the living status of the face/person in the photo. This field, for example, may default to "Unknown." In embodiments where user 204 marks a face as "Living", the metadata associated with that face is kept private and not shared w % ben the facial pairing process notes a possible pairing. If a user makes a "Match" with their target face and a face from another user whose Living Status is marked as "Living," the user will not receive the metadata associated with that face if a match is made. A notification may be sent alerting the user that the information associated with that face is private.

In some implementations, when "Unknown" is selected, the face is treated as "Living," unless the photo is dated more than a threshold length of time (e.g., over 100 years old). In these embodiments all faces in the photo are assumed to be "Deceased." If the age of the photo is "Unknown", then all persons are assumed "Living" unless the originating user changes the date status.

In embodiments where a user selects "Deceased", then all metadata associated with that face in the photo may be open to pairing, matching, and sharing with users who make face related pairings with that face.

In embodiments where dates, such as Birthdate or Death Date, are not known, but the user 204 may have an estimation of a possible Date Range, the user may be allowed to select a Plus or Minus Year Estimator. In these embodiments the user 204 may choose to provide a Guess Year and then further select a Year Range of plus or minus Y years, where Y is a real number and may or may not be restricted to a whole number. Y may, or may not, be further restricted to a number smaller than, or equal to, some number such as 3, 5 or 10 years, for example.

In embodiments where a user has provided a name for a face, that face, in some cases, may be referred to as a person. With the inclusion of metadata, that face may also be referred to as a profile.

In some embodiments, isolated faces from photos returned to the platform by the facial mapping process are given a Unique Facial Identifier (UFI) which may be made visible to the user. The UFI, for example, associates the face with the originating photograph and the user who loaded the image. This allows the portion of the original image containing the face to be treated as an independent image with unique features and metadata.

In some embodiments, when the photo contains multiple faces which were isolated by the facial mapping process, after entering any known metadata about a first face, a user may accept changes (e.g., click "Accept") and the platform may automatically move to the next isolated face. This process may continue through the remaining faces. In some embodiments, a user may choose to enter metadata for a face other than the one recommended by the platform. In such cases, a user may select any face they wish by clicking on the image of the face for which they would like to enter metadata Users are not required to enter metadata for a face, but, in some implementations, they are required to "Accept" or "Ignore" the isolated image of the face, or skip the entire metadata loading process and move to another feature or page on the platform.

The user 204, in some embodiments, may choose not to enter any metadata for a given isolated face. In some cases, the UFI may be presented as a face identifier, but does not replace any name metadata, provided by the user. When a user creates a profile for a face, it will be created based on the metadata provided by the user. The UFI, the face, and its relationship to the original photo will not change based on the metadata entries. Furthermore, lack of metadata from a user does not preclude the face from the facial pairing algorithm.

The user interactions, in some embodiments, are provided to the service 202 for storage in the data store 201 as metadata entries. The facial metadata received back from the facial mapping process may be permanently associated with the photo and each individual face identified and mapped by the facial mapping process.

Returning to FIG. 6, in some implementations, metadata extracted by the facial mapping process is utilized to enhance the pairing process through the use of Artificial Intelligence (AI). For example, the metadata may be provided by the process 200 of FIG. 2 to an AI data collection and processing engine 608. In an illustrative example, the AI data collection and processing engine 608 may apply gender metadata for enhancing the facial pairing process by dynamically eliminating faces that do not meet this criterion (e.g., eliminating one gender to search for another). In some embodiments, if a user does not know the gender of a face in their photo, then the gender identified by AI may be utilized (e.g., the AI data collection and processing engine 608 may decide a default gender, for example for weighting purposes in making pairing matches). Further, if a user consistently does not supply the gender for the faces they submit, AI data collection and processing engine 608 may learn to automatically assign a gender for that user's faces based on the results from the facial mapping process.

The AI data collection and processing engine 608, in some embodiments, applies one or more machine learning classifiers to platform data. The faces, profiles, metadata, and other platform data may be arranged in a variety of manners to apply machine learning and/or cluster analysis by the AI data collection and processing engine 608 such as, in some examples, a convolutional neural network (CNN), deep neural network (DNN), clustering tree, and/or synaptic learning network. The machine learning classifiers, for example, may each represent one or more convolutional neural network (CNN) stages of a CNN model. CNN models, for example, are designed to break down features of graphical or image data. This makes CNN classification particularly advantageous for image classification. Further, CNN models, as opposed to fully connected artificial neural network layers, can be used to constrain the output space, thereby reducing the complexity and processing demands. In some implementations, the CNN model may include a network in network (NiN) model. NiN models, for example, take CNN processing to another level by analyzing a network of convolutional layers of the input data. The particular architecture of CNN model being applied, in some examples, may be based in part on processing availability and/or storage size availability in the end system (e.g., a cloud network versus processing on a medical device), third party tool access (e.g., availability of cloud provider specialized tools and hardware for performing image classification), and/or processor type (e.g., GPU, CPU, FPGA, etc.). Further, the architecture of the CNN model may be selected in part based upon the complexity and truth data set required to train the model. CNN models, as opposed to fully connected artificial neural network layers, for example, are typically easier to train and can generate good results based on more limited truth data sets. In another example, the machine learning classifiers may each represent one or more deep neural network (DNN) models. DNN models, for example, perform regression and classification on data input, potentially proving more successful where the classifiers are combined with additional information, such as metadata, to classify the images.

In some implementations, a user requests to review pairings (604). Facial pairing involves application of machine learning techniques to identify photographs containing the same face/person and displaying those pairings to users for collaboration, final confirmation and matching. All metadata and facial mapping process results, in some embodiments, are processed via a facial pairing algorithm (FPA) described in relation to FIG. 4. Additional Artificial Intelligence/Machine Learning techniques may be applied to improve outcomes. The mapping process, for example, is initiated via a graphical user interface presented to the user at a user device (e.g., mobile phone or other computing device).

Figure 3:
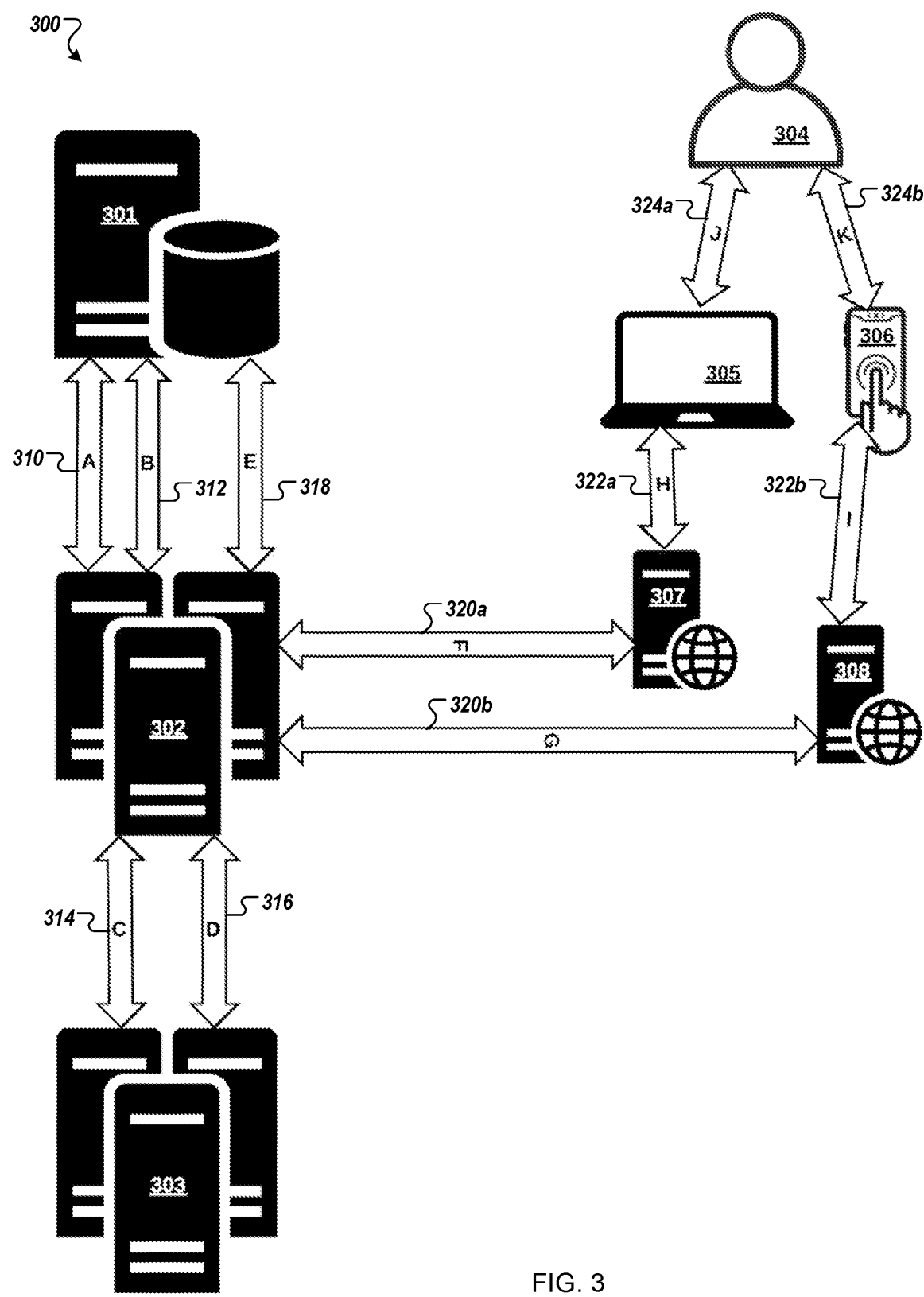
FIG. 3 is a flow diagram of an example facial mapping process.

Turning to FIG. 3, in some embodiments, a facial pairing process flow 300 begins with obtaining identification of a target face and any metadata associated with the face (310). For example, a face selected by a user 304 may be associated with a unique facial identifier (UFI). The database and/or servers 301 may obtain information associated with the UFI such as, in some examples, facial measurements, facial attribute values, and/or metadata. The facial measurements and other facial attributes may have been derived through analysis applied by the facial recognition service (FRS) 203 described in relation to process 200 of FIG. 2. The identification and metadata are obtained, as illustrated, by a server(s) or service(s) 302 configured to analyze the facial attributes (e.g., a facial feature similarity (FFS) application, algorithms, and/or service). If no facial measurements and/or attribute values are available, in some embodiments, the FRS 203 is invoked.

In some embodiments, targeted analysis of the target face is conducted by the server(s) or service(s) 302 to compare the numeric results of the target face versus at least a portion, and up to an entire library of facial attributes, measurements, and/or metadata for faces stored by the database(s) and/or server(s) 301 to identify potential pairs. The pairs may be identified based on statistical probability, one or more neural network learning algorithms, and/or actively learning neural network configurations designed to accept match information and apply the match information to tuning matching strategies.

In some embodiments, one or more potential pairs may be provided as facial feature similarity (FFS) results to the database(s) and/or server(s) 301 (312). Each pairing may include a likelihood (e.g., a percentage estimated accuracy, a score, etc.) that the faces in the pairing may be of the same person. The results may include results of all pairings, regardless of how unlikely the match is based on the percentage or score. Results, in some embodiments, are associated at the database(s) and/or server(s) 301 with the image(s). However, the results may not be returned to the user(s) until further processing is completed.

In some embodiments, the FFS results are provided to a facial recognition service (FRS) 303 for direct comparison of each potential match in relation to the target face (314). The direct comparison, for example, may include feature similarity based on the facial measurements, attributes, and/or metadata (e.g., to the extent overlapping types of information exist for both the target face and the given potential match). Each result from the FRS (e.g., enhanced FFS result), in some implementations, includes an adjusted likelihood (e.g., percentage estimated accuracy, score, etc.) that the faces in the pairing may be of the same person. In other implementations, the FRS results may be maintained separately from the FFS results and combined at a later time.

Figure 4:
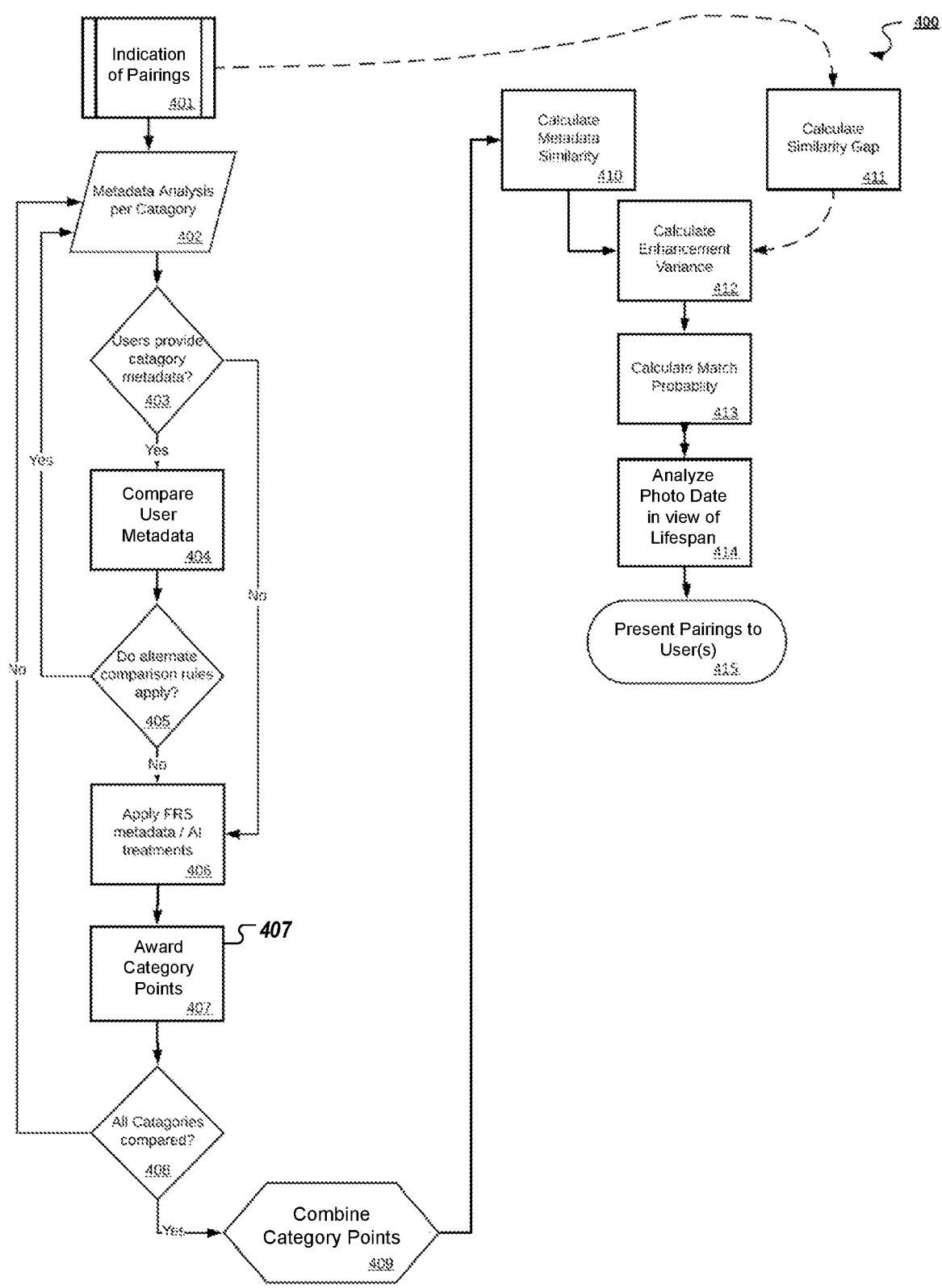
FIG. 4 is a flow diagram of an example facial pairing algorithm process.

Turning to FIG. 4, a flow chart illustrates an example method 400 for performing a facial recognition comparison of facial measurements, attributes, and/or metadata between a target face and another potential matching face. The pairing of faces may be enhanced by the application of enhancement rules, guidelines and/or processes. Although illustrated in the method 400 as a series of operations, in other embodiments, various enhancements and/or treatments may be performed simultaneously and/or in a different order. The method 400, for example, may be performed by the FRS 303 described in relation to FIG. 3.

In some embodiments, the method 400 begins with receiving indication of a pairing between a target face and one or more potentially matching faces (401). For example, the operation 314 of FIG. 3 may indicate to the FRS 303 that a pairing has been identified through artificial intelligence and/or machine learning analysis.

In some implementations, metadata analysis is applied for each category of one or more categories (402). In some embodiments, a pairing is enhanced with a points system or weighted confidence system. For example, metadata similarities may increase points in a predetermined amount, which may be applied linearly or applied in a weighted fashion, (e.g., similarities corresponding to uncommon traits such as First and/or Last Name matches may be scored with more points than similarities corresponding to common traits such as gender or glasses). Further, metadata non-similarities may apply punitive points, or points reductions, in either a linear or weighted fashion. The application of enhancements may also result in neither an increase nor a decrease in points.

In some implementations, if the user has provided one or more categories of metadata (403), the user metadata is compared per a series of pairing analysis rules (404). For example, where metadata is available for both faces in a pairing, a comparison may be performed to determine the similarity of the metadata, and points may be awarded/scored according to rules. Points awarded may, or may not, be whole numbers and may be positive, negative or zero, but will exist in the realm of real numbers.

In some embodiments, metadata fields are populated with alpha text categories. Alpha text characters may refer to, but are not limited to, a Person's Name (e.g., First, Middle, Last, or Other/Nick/Alternate Names). In some embodiments, Name Category fields may be directly compared with like fields, Direct Field Comparison, (e.g., First Name to First Name) and in other embodiments Name Category fields may be compared to unlike fields, Cross Field Comparison, (e.g., First Name to Middle Name).

In some embodiments, a name may contain numbers or special characters (e.g., hyphen). These characters may be treated as any other alpha character in the comparison. Conversely, these characters may be removed (e.g., the period after "Sr.") or the notation otherwise adjusted to a conformed term (e.g., all "Jr." or "Jr" modified to "junior").

In some embodiments, users in a pairing may have entered metadata in different languages. In these embodiments, language translation may be applied to produce the best results for the comparisons and users. This may include, but is not limited to, the addition of, or ignoring of, accents, umlauts, and schwas.

In some embodiments, characters in any alpha text metadata category field comparison are compared in the order the characters appear in the field. The order of the letters in each field may matter to the comparison as some words contain the same letters but are not the same word (e.g., arc and car).

In some embodiments, Direct Field comparisons refer to comparisons between, but not limited to, First Name to First Name, Middle Name to Middle Name, Last Name to Last Name, and/or Other Name to Other Name (e.g., Nick Name, Maiden Name).

In some embodiments, Cross Field comparisons produce results which are significant and compelling to the analysis. Some such comparisons may be, but are not limited to, Middle Name to First Name metadata field comparisons, for example. This type of comparison may be performed, for example, if the Direct Field comparison (e.g., First Name-to-First Name) comparison returns a less than A % metadata match where A is some number (e.g., 75) to be determined by test results and/or real product use.

In some embodiments where the Cross Field comparison is performed, it may be necessary to perform the comparison twice for the same facial pairing (e.g., one comparison may be performed by comparing face 1's Middle Name field to face 2's First Name field, and the second by comparing face 1's First Name field to face 2's Middle Name field). If either or both comparisons return a Character Similarity (CS) greater than or equal to A %, for example, then points may be awarded in place of the original Direct Field comparison (e.g., First Name to First Name comparison). For example, the points may be applied to the Numerator calculation and the Denominator overall total points possible, as discussed below. In these Cross Field comparisons (e.g., Other Name to First Name), numerator points awards may only be applied one time. If a greater than or equal to A % metadata CS is made with both comparisons, scoring may be awarded to the Character Similarity with the greatest similarity percentage.

In embodiments where a Cross Field comparison does not derive a similarity within a threshold (e.g., X scoring points, greater than or equal to A %), then the original Name to Name (e.g., First Name to First Name) comparison results may be scored.

In some embodiments, additional metadata fields may receive similar treatment for the facial pairing. Some of these metadata fields may be, but are not limited to, a Cross Field comparison of Other Name to First Name metadata fields, Other Name to Middle Name metadata fields, and/or Other Name to Last Name metadata fields. In some embodiments a face may have multiple Other Name fields and in such embodiments the comparison for each Other Name may be performed as described above until all Other Names have been compared.

In some embodiments, additional types of alpha text categories may exist. In such cases, these metadata fields may be treated similarly to the above treatments. Metadata fields may be compared against like field, or cross compared as necessary to obtain relevant results (e.g., Military Branch of Service to Military Branch of Service, Photographer/Studio to Photographer/Studio). These types of metadata fields may also contain numerals and/or special characters in addition to alpha characters.

To establish a Metadata Similarity Numerator (N), points may be awarded for character similarity. Points awards may also be referred to as scoring. To achieve the desired scoring and to establish the appropriate N the following rules and/or guidelines may apply.

In some embodiments, numbers applied to the scoring process are real numbers. The numbers may be positive, negative or zero, and may be, but are not limited to, whole numbers. Points awards/scoring may be awarded in a linear manner and/or a weighted manner.

In some embodiments, when making comparisons between category metadata fields, only one of the rules/guidelines apply for each category per comparison. The application of the rules/guidelines may be determined, for example, by the results of the character comparison and may be subject to a limit and/or range.

In embodiments where no metadata is provided for a category (left blank), for at least one of the faces in a pairing, a comparison may, or may not, be performed for that category. For example, points may be awarded to indicate the lack of metadata (e.g., zero points). Any points awarded/scored may be applied to the N cumulative total.

In some embodiments, the character comparison returns a character similarity of less than or equal to some percentage or threshold value B. The value of B may be adjusted up or down to provide best outcomes (e.g., B=50%), for example using machine learning analysis to user accepted matches and user rejected matches. Category Metadata Field comparisons, which may be determined to have a CS of less than or equal to B, may be determined to be different words and not a match. A point award commensurate with this result may be awarded to the N total (e.g., negative one (−1) may be added to the Metadata Similarity Numerator resulting in a lower N total).

In some embodiments the character comparison returns a character similarity between greater than a first threshold percentage or value B and less than a second threshold percentage or value C. The value of C may be adjusted up or down to provide best outcomes (e.g., C=75%), for example using machine learning analysis to user accepted matches and user rejected matches. In these cases, it may be determined there may be a partial Character Similarity (e.g., as in the case of a misspelling). A points award may be made to N commensurate of this type of result (e.g., positive one (1) may be added to the Metadata Similarity Numerator there by increasing N total in a more linear fashion).

In some embodiments, the character comparison returns a similarity between equal to or greater than C and less than or equal to 100% Character Similarity. In these cases, it may be determined to be the same word, with possibly only a minor misspelling if not a 100% CS. A points award may be made to N commensurate with this type of result (e.g., positive three (3) may be added to the Metadata Similarity Numerator there by increasing the N total in a more weighted fashion).

In some embodiments comparisons for similarity are made for category metadata fields containing metadata related to Places. These types of comparisons may be for places such as Birthplace, Deathplace, Photo Place, but are not limited to those examples.

In some embodiments, Place Field comparisons are similar in treatment to Name comparisons as they may be in an alpha text format. Numerals and special characters may also populate these metadata fields when those characters are part of the name of a place (e.g., Krems 1, Schleswig-Holstein, Germany, or Krems 2, Schleswig-Holstein, Germany, where these places contain numbers and also a special character of a hyphen).

In some embodiments, Direct Field comparisons are performed. This refers to comparisons between, but not limited to, like kind metadata fields (e.g., Birthplace to Birthplace, Deathplace to Deathplace, Photo Place to Photo Place).

In some embodiments Cross Field comparisons are performed. This refers to comparisons done between, but not limited to unlike kind metadata fields (e.g., Birthplace to Photo Place).

In some embodiments, Place Category metadata fields may contain Subcategory fields (e.g., City, County/Parish, State/Province, and Country). Place Subcategory fields are not limited to these examples.

Where no metadata is provided for a Category or Subcategory (e.g., left blank) for at least one of the faces in a pairing, in some embodiments, a comparison may or may not be performed for that Category/Subcategory. Points may be awarded, for example, to indicate the lack of metadata (e.g., zero points). Any points awarded/scored may be applied to the N cumulative total.

In some embodiments. Metadata Similarity Numerator points awards are made by the aggregate scoring of all the components of a place as a whole such as the entirety of the city, county/parish, state/province, and country.

In some embodiments, characters in a comparison are compared in the order they appear in the metadata field as letter order may have relevancy (e.g., the letters c, a, and r may be ordered to spell car, or they may be ordered to spell arc. These two words are not the same).

In some embodiments, Place Subcategory metadata fields are compared against the like kind field from the other face in the pairing (e.g., City-to-City, and/or Country-to-Country).

In some embodiments, points awards/scoring may be dependent on the results of the character comparison made for each subcategory. Comparisons returning a Character Similarity greater than or equal to some percentage P (e.g., P=75%) or threshold value P, for example, may be considered similar, whereas Character Similarities less than P may be considered dissimilar. P may be a number in the realm of real numbers.

In some embodiments, Character Similarity comparison results receive points awards. Points awards may be positive, negative or zero (e.g., a comparison deemed to be similar, or the same, may receive a positive points award/score such as one point, whereas a comparison deemed to be dissimilar may receive a punitive points award such as negative one point).

In some embodiments, the Subcategory Character Similarity Comparisons are accumulated to derive a total sum that may be awarded for a Category to the N total (e.g., one point for City-to-City comparison, zero points for County-to-County comparison, one point for State-to-State Comparison, and one point for Country-to-Country comparison would equate to a total of three points added to N).

In some embodiments, a points weighting is applied. For example, some subcategories, or combination thereof, may be deemed more valuable than others, such as Character Similarities made with both a City and Country comparison may be awarded additional points, or comparisons where ALL subcategory comparisons are determined to be similar may result in bonus points awarded to the Category Comparison and therefore to the N total.

In some embodiments, Category and/or Subcategory metadata fields are populated with numeric characters (e.g., Dates).

In some embodiments, Date Categories refer to, but are not limited to, dates affiliated with Persons and/or Photographs (e.g., Birthdate, Death Date, Photo Date).

In some embodiments, Date Categories include metadata fields for Subcategories (e.g., Day, Month, Year).

In some embodiments, the use of numerals may be of more benefit to the Character Similarity process than that of an alpha text comparison. For example, if a user provides data in an alphabetic form, that metadata may be converted to its numeric equivalency (e.g., January may be converted to 1, July may be converted to 7, December may be converted to 12). In some implementations, users are restricted to only entering numeric metadata (e.g., the third day of a month may only be represented by the numeral 3, or in other embodiments, the year One Thousand Nine Hundred may only be allowed to be entered as 1900).

Numerals may be compared in the order they are presented, as a change in order my produce a different number (e.g., the numbers 1,2,3 and 4 may be arranged to represent different years, such as 1234, 1342, and 1423.) Metadata fields containing the same numerals may not represent the same date if taken out of order. In some implementations, dates may be adjusted to a same form (e.g., month-day-year rather than year-month-day).

In some embodiments, a Year Subcategory metadata field adds a date range of plus or minus Y number of years as prescribed by the user, where Y is a real number and may, or may not, be a whole number. This range may be restricted in some examples. For example, a limit of plus or minus 5 years would indicate the user may select any number of years from 1 to 5 years to add or subtract from their year estimate a.k.a. "Guess" Year (e.g., A+/−5 Year Estimator added to a year of 1900 would produce a date range of 1895 to 1905). This may be referred to as the Plus or Minus Year Estimator (+/−YE).

In some embodiments, Subcategory metadata fields are compared against like Subcategories for Metadata Similarity (e.g., Day field compared to Day field, Month field compared to month field, Year field compared to year field).

In some embodiments, other forms of dating such as, but not limited to, the allowance of seasons (e.g., winter, summer) is utilized. In these embodiments the use of alpha characters may be allowed and/or a numeric conversion may be utilized.

In some embodiments, Date Categories are compared with like kind Categories (e.g., Birthdate to birthdate, Death date to Death Date).

In some embodiments, a modified Cross Field Comparison is performed. Comparing Photo Dates for similarity, for example, may have a low probability of returning a match, even for a year only comparison, however, the Photo Date may be valuable in determining if an individual could be in a photo when compared against a person's Birth and Death Dates.

In some embodiments, other category metadata fields, such as, but not limited to, Military Service Dates, are compared in a similar manner as described herein.

In some embodiments, to utilize dates as a treatment in the facial pairing and to apply enhancements, the scoring/awarding of Points to the Metadata Similarity Numerator may be performed. The determination and calculation of these points may follow certain guidelines presented herein. Some exceptions to the guideline may exist (e.g., Photo Date metadata treatments). Any additional Date Categories and/or Subcategories, not specifically mentioned in this document, may expect similar treatments as described herein.

In embodiments where no metadata is provided for a Category or Subcategory (e.g., left blank), for at least one of the Faces in a pairing, a comparison may, or may not, be performed for that Category/Subcategory. Points may be awarded to indicate the lack of metadata. (e.g., zero points) Any points scored/awarded may be applied to the N cumulative total.

In some embodiments, category metadata fields are compared against like kind fields from the other face in the pairing (e.g., Birthdate-to-Birthdate, and/or Death Date-to-Death Date).

In some embodiments, Subcategory metadata fields are compared against the like kind subcategory fields from the other face in the pairing (e.g., Day-to-Day, Month-to-Month, and/or Year-to-Year).

In some embodiments, points awards/scoring is dependent on the results of the character comparison made for each subcategory. Comparisons returning a Character Similarity greater than or equal to some percentage X (e.g., X=95%), for example, may be considered similar, or the same, whereas Character Similarities less than X may be considered dissimilar. X may be some number in the realm of real numbers.

In some embodiments, Character Similarity comparison results receive points awards. Points awards may be positive, negative or zero (e.g., a comparison deemed to be similar, or the same, may receive a positive points award such as one point, whereas a comparison deemed to be dissimilar may receive a punitive points award such as negative one point).

In some embodiments, users may be unsure as to the exact year a Person/Face was born or died or when a photo may have been taken. To accommodate such circumstances users may choose to use a plus or minus Year Estimator option. If one, or both, of the users in a pairing have selected this option, then the metadata comparison may be subject to additional and/or special treatments.

In some embodiments, both faces in the pairing may belong to the same user. Guidelines establish for same user pairings will apply. Where guidelines permit, these faces will receive the same treatment as a pairing between two different users.

In some embodiments, one or more users in the pairing may have supplied metadata for their Day and Month metadata fields as well as supplying a Year Estimation and selecting the Plus or Minus Year Estimator (+/−YE). In some cases, the Day and Month metadata may be deemed irrelevant if that metadata does not materially add to the +/−YE.

In some embodiments, where a comparison involves a case where one user utilized the +/−YE while the other user in the pairing provided a definitive Year for their Face's date (e.g., Birthdate), the Face with the definitive year provided by the user may be used as the base, or Anchor Year, for the comparison. For example purposes, we will label the Face with the Anchor Year as Face 1 and the Face utilizing the +/−YE as Face 2; keeping in mind that Face 2 has supplied a "Guess" Year as well as selecting the +/−YE. Face 1's Anchor Year may be compared against Face 2's Guess Year to assess if they may be the same, as described above. If Face 1 and Face 2's Years prove to be the same, then that CS comparison may receive the same treatment as described above for N points awards in a Year-to-Year comparison. The Anchor Year for Face 1 and the Guess Year for Face 2 may not be the same. In these cases, an assessment may be made to determine if Face 1's Year falls withing the +/−YE selected by Face 2's user. If Face 1's Anchor Year falls within the Year Range established by Face 2's +/−YE, then points may be awarded to the points total for the Category comparison being performed and additionally to the N points total. The points eligible for score/award may be determined by the closeness in proximity the two faces' Birthyears are apart in years. For example, where Face 1 provides a definitive Birthyear of 1902 and Face 2 provides a Guess Year of 1900 and has further selected a +/−YE of 5 years, resulting in a Birthyear Range of 1895 to 1905. Since 1902 and 1900 are not the same year, an additional analysis may be triggered.

In some embodiments, years determined to be within differing proximities of the Anchor Year receive different points awards, be they positive, negative or zero. Example: 0 to L years, where L=2 years from the Anchor Year, may receive more points than a year determined to be of greater distance from the Anchor Year. Other distances from the Anchor Year may offer different points awards such as, K=1 year may be awarded more points than L and M=4 years may be awarded fewer points toward the N total. These values will be real numbers and may or may not be whole numbers. Continuing the example: the Anchor Year being 1902 lies two years from Face 2's Guess Year but is inside of the overall Year Range established by the +/−YE of 1985 to 1905. In some embodiments, this distance may warrant a points award. For this example, an award of 1 point may be given. If the Anchor Year were perhaps 1904, the distance of four years from Face 2's Guess Year, it may warrant a different points award, (e.g., 0.5 points or even zero points).

In some embodiments, the Anchor Year lies outside the +/−YE established by the second user in the pairing. In such cases, points awards may, or may not, be punitive (e.g., negative point(s) to the N points total). Continuing the example: if the Anchor Year lies outside of the Year Range established by the +/−YE, then it may be reasonable to believe the dates are too distant to be the same. For this example, the Anchor Year may have been 1884. This year would lie beyond the 5 years estimated for Face 2's Birthyear and therefore reasonable to determine they are dissimilar or not the same. Points awarded to N may reflect such a case and may be punitive.

In some embodiments, neither users definitively know a date (e.g., Birthdate) for the faces that have been paired. However, in some cases, both users may provide a Guess Year and selected the +/−YE option. In such cases, the comparison would then be between two Year Ranges. The comparison would look for commonality between the two ranges. Points may be awarded in accordance with the extent of the commonality between the ranges. Ranges failing to establish commonality, or establishing an insufficient commonality, may or may not receive punitive point(s). Example 1: User 1 guesses the Birthyear for Face 1 in the pairing to be 1900 and selects a +/−YE of 5 years, and User 2 guesses the Birthyear for Face 2 in the pairing to be 1903 and select a +/−YE of 3 years. This would produce a Birthyear Range for Face 1 of 1895-1905, and a Birthyear Range for Face 2 of 1900-1906. As both years share 1900 through 1905 (5 years) as common years, a points award may be made commensurate with such a result. Example 2: If User 2 selected 1901 as the Guess Birthyear for Face 2, and kept all else the same, the commonality for the faces would have been 1898 through 1904 (6 years). This scenario may allow for a greater points award to N to be made than in Example 1. Example 3: If User 2 had selected 1907 as the Guess Birthyear for Face 2 with a +/−YE of one year, and Face 1's data remained the same, the Year Ranges would not overlap. This scenario may result in a lesser points award to be made to N than in Example 1 or even a punitive points award.

In some embodiments, impossible scenarios may occur (e.g., photo taken 20 years before the listed birthdate for a face in a pairing). In such cases these pairings may not be removed from the pairing process, but instead may be scored lower when the pairs are presented to the user. For example, the process may have identified a different family member with similar facial features, such that the user would be interested in reviewing the impossible match. In another example, such pairings may be discarded from the provided matches.

In some implementations, if alternate comparison rules apply (405), cascaded category comparisons may be executed to establish prerequisite similarities to award (or reduce) points regarding a category. For example, a gender of male may be a prerequisite for awarding points for facial hair. In another example, recognition of insignia and/or badges may be a prerequisite for awarding military service points (e.g., as opposed to other uniforms such as police uniforms).

In some implementations, metadata gleaned through facial recognition and/or machine learning are compared (406). The metadata may include, in some examples, facial measurements, estimated eye color, estimated race, and/or estimated distinguishing features such as birth marks, scars, or tattoos. To improve and enhance the accuracy of a pairing, beyond the results returned by the FRS, some treatments may be applied. These enhancements, in some cases, may be derived from treatments applied to the metadata provided by the users. For example, user 1 may submit a photo of a male in military uniform, but not indicate the subject was in the military. Artificial Intelligence may identify the branch of service and the period of service from known military uniform insignia. This metadata may be utilized if or when a pairing is made with that face and the paired face was indicated by the second user to have served in the military, but the paired face is not shown in uniform, nor any other military service information is provided by the second user.

In further implementations, the photos and data acquired from archives may bring unique data elements to the process. In some embodiments, metadata utilized by the method 400 may be derived from, in some examples, public records, public archives, and/or private archives. In some embodiments, a target face may be paired with a face from a photo in a special archive, and that pairing may receive special treatment. Users who have a face that is paired with a face from a special archive may see the isolated face being paired with their target face, but they may not be allowed to view the entire photo image, nor the metadata associated with the image, unless the user is subscribed to the archive from which the image originated.

In some implementations, users who have not subscribed are presented with a control, such as a link button, which will take them to the subscription page where they may choose to subscribe. An archive may be provided to users free of charge. Users who subscribe to an archive may, in some cases, be requested and/or required to provide additional metadata for their photos and faces. An example of this type of archive may be a military archive. With a standard subscription, a user may be able to indicate if a face/person has served in the military, or not, but with the additional military service subscription the faces/profiles a user indicates as having served in the military may then be compared against the special military archive database. Additional military metadata a user may be asked to provide about their face/person may be, but is not limited to, Rank, Dates of Service. Date of Discharge, Branch of Service, Company or Division of Service, Place of Entry. Place of Discharge, Type of Discharge. The face matching process for users with subscriptions may operate the same as described above.

In some implementations, once all comparisons for a given category have been performed, category-level points are determined (407). For example, the Subcategory Character Similarity Comparisons may be accumulated to derive a total sum that may be awarded for a Category to the N total (e.g., zero points for Day-to-Day comparison, one point for Month-to-Month comparison, and one point for Year-to-Year comparison would equate to a total of two points added to N).

In some embodiments a points weighting may be applied. (e.g., some Subcategories, or combination thereof, may be deemed more valuable than others, such similarities made with both a Month-to-Month and Year-to-Year comparison may be awarded additional points, or comparisons where all Subcategory comparisons are determined to the same may result in additional points awarded to that Category Comparison and therefore to the N total).

In some embodiments, a Subcategory metadata field may be determined to have little stand-alone value. For example, cases where a subcategory field may be treated differently to the other subcategory metadata fields may exist (e.g., Day Subcategory metadata fields on their own may be irrelevant, such that, for example, providing only a Birth Day with no metadata for Birth Month or Birth Year may prove not worthy of a points award, or may require a punitive points award to N).

In some implementations, once all categories have been compared (408), the comparisons are combined to calculate combined category points results (409) and a metadata similarity result is calculated (410). In some examples, the calculation may include, but is not limited to, the use of a Metadata Similarity Numerator (N), a Metadata Similarity Denominator (D), a Metadata Similarity (MS), an Enhancement Variance (EV), a Similarity Gap (SG), a Match Probability (MP), and/or a Facial Recognition Service Facial Feature Similarity (FFS). In some embodiments, the Metadata Similarity Denominator (D) for the calculation equals the sum of the maximum possible point available for all the categories of metadata. This number may be adjusted as new Categories for metadata are added or, possibly, Categories removed. In some embodiments, the Metadata Similarity Numerator (N) for the calculation is a result of the accumulation of points awarded for metadata similarity in categories. It may occur that at least one face in a pairing has no metadata for a category. In those instances, that category may or may not be ignored in the numerator calculation, depending on applications of the rules and/or AI treatments by operations 404 and 406 (e.g., no addition or subtraction is made to the numerator points total).

In some embodiments the Metadata Similarity may increase the surety of the pairing while in other embodiments it may decrease the surety of the similarity of the pairing when applied to the facial feature similarity (FFS). To obtain this increase, or decrease, in the surety of the pairing, additional calculations may be applied.

In some implementations, a Similarity Gap (SG) is calculated (411). For example, the FFS score may be converted from a percentage to an integer and then subtracted from 1 to establish the Similarity Gap (e.g., an FFS of 85% becomes 0.85 by dividing 85 by 100; 0.85 is then subtracted from 1 to determine a Similarity Gap (SG), e.g., 1-0.85=0.15 where 0.15 is the Similarity Gap). In some embodiments, the SG is enhanced either positively or negatively by the Metadata Similarity score.

In some implementations, an enhancement variance is calculated (412). For example, the Similarity Gap may be multiplied by the Metadata Similarity to obtain an Enhancement Variance (EV) (e.g., SG×MS=EV: 0.15×0.53=0.0795).

In some implementations, a match probability is calculated (413). At the completion of all metadata comparisons, the Metadata Similarity Numerator (N) and the Metadata Similarity Denominator (D) are known and may then be applied to components of the facial pairing which determine the Match Probability (MP). The purpose of the calculation is to determine how much metadata the two paired faces have in common, if any (e.g., assuming 15 categories of metadata with a maximum, linear and/or weighted, points available for all categories equal to 36 available points; 36 becomes the denominator (D); after the comparison, the similarity in the metadata yields a point total of 19: the numerator (N) for the calculation in this example is 19). In some embodiments the Enhancement Variance may be added to the FFS score to obtain the Match Probability (MP) (e.g., FFS+EV=MP: 0.85+0.0795=0.9295). Prior to showing the MP to a user it may be converted to a percentage Match Probability (e.g., 0.9295×100=92.95%). Further, when the D and N become known, a calculation may then be performed to determine the percentage of similarity in metadata between the sources, be the sources users, public information, archives, etc. The formula for this calculation, for example, may be N/D=Metadata Similarity (MS) (e.g., 19/36=0.5278 or approximately 52% MS).

In some implementations, an analysis is made of the photo date in relation to the lifespan of the face(s) (414). In some embodiments metadata from users, the FRS, and AI are utilized to determine if a Person could be in a photo based on the Face/Person's own Lifespan and age, or appearance of age, at the time the photo was taken. Based on the metadata provided, for example, multiple (e.g., two) analyses may be performed to determine if it is possible for a face to appear in a photo. If either analysis indicates a face is unlikely to have been alive at the time the photo was taken, then the users in the pairing may receive an alert.

A first analysis, for example, may perform the following processes based on the metadata provided by the users. A Photo Date comparison may be performed on the Year fields as the year a photo was taken is more likely to be known, or accurately estimated, than the Day and/or Month the photo was taken. However, if Day and/or Month data is known, then those fields may be considered in the comparison. In some embodiments, Photo Date may be utilized by comparing the Photo Date for one face in the pairing against the Lifespan of the other face in the pairing. Photo Date comparisons may be performed if at least one of the following scenarios applies: User 1 in the pairing has provided at least a Year in their Photo Date field and User 2 in the pairing has provided at least a Year for both their face's Birthdate and Death Date metadata fields, and/or User 2 in the pairing has provided a Year in their Photo Date field and User 1 in the pairing has provided at least a Year for both their face's Birthdate and Death Date metadata fields. If no Photo Date metadata is provided for both of the faces in the pairing, then there may be insufficient data to complete an analysis. If at least one of the qualifying scenarios listed above is true, then, in some implementations, the following process is performed. The Photo Date for one photo in a pairing may be assessed to see if it fits between the Birthyear and Death Year (Lifespan) of the face from the opposing photo in the pairing to determine if the face/person could have been alive at the time the first photo in the pairing was taken. When comparing a Photo Date against the Lifespan of the opposing face in a pairing, if metadata is not provided for either the Birthdate and/or Death Date metadata subcategory fields for that face, then it may be determined that insufficient data is provided for the analysis. In some embodiments either, or both, of the photos in the pairing may have metadata in all the subcategory fields necessary for a comparison: Photo Date. Birthdate, and Death Date. In these cases, the following process may be applied. The Photo Date for one photo may be compared against the Lifespan for the opposing face in the pairing. If the Photo Date lies within the Lifespan of the face, then it may be determined possible for the face to have been alive at the time the photo was taken. If the Photo Date lies outside the Lifespan of the other face in the pairing, then it may be determined not possible for the face to have been alive at the time of the photo was taken, and both users may receive an alert indicating such. In some embodiments, if one or both of the users has selected the Plus or Minus Years option for their Photo Date Year, the following may apply. The number of years chosen by the user for their +/−YE may be applied to the Year metadata the user provided for the Photo Date (e.g., a plus or minus three-year selection would create a six-year range). The year range may be compared to other face's lifespan to determine if any part of the first photo's Year Range falls within the lifespan of the other face in the pairing. If either or both users chose the +/−YE for either or both their Birth Year and their Death Year, then those ranges may be considered when establishing the lifespan and may expand the possible lifespan based on the user provided metadata.

A Second Analysis may utilize the estimated Age data returned by the FRS and/or AI data collection, analysis and application to assist in determining if it is likely a face/person who could possibly have been in a photo at the time it was taken based on a comparison of the estimated age of the person returned by the FRS and/or AI and the Lifespan of that face/person based on metadata provided by the user. In some embodiments, users may not provide metadata. In those cases, an analysis might not be completed. In embodiments where metadata has been provided, Photo Dates may be compared against the Birthdates of both the faces in the photo pairing to determine possible ages for the faces in the pairing. These ages may be further compared against the proposed ages provided by the FRS and/or AI to see if they may be reasonably close to the ages of the faces in the photos as provided by the users (e.g., if a user provides a Birthyear for a person in their photo as 1900 and the other user in the pairing states their photo was taken in 1925, then the Age Analysis may set a proposed age of 25 years (1925–1900=25) for that face). The proposed age, based on the user provided metadata, may then be compared against the estimated age provided by the FRS and/or AI to determine if it is possibly the same face/person in the photo (e.g., if the user-provided metadata estimates the age of the person to be 25, but the FRS and/or AI results indicate the paired face appears to be about 50 years of age in the photo, then it may be determined unlikely the two faces are the same person). In cases when the Age Analysis indicates the faces are unlikely to be the same person, users may receive an alert.

People may visually age at different rates. To address this, in some embodiments, a range may be established to assist the placement of the FRS and/or AI estimates. FRS and/or AI age estimates proving to be within plus or minus Z years of the age provided by the user(s) may be considered possible according to some ranges for Z. These ranges and values for Z may be adjusted, as necessary, to provide the best results. Examples of these ranges may be FRS and/or AI results aging a face between 0 and 3 years of age may fall within a plus or minus 2-year age range of the user provided metadata, or FRS and/or AI results aging a face within 21 to 35 years of age may fall within a plus or minus 10-year age range of the user provided metadata, or FRS and/or AI results aging a face more than 70 years of age may fall within a plus or minus 25-year age range of the user provided metadata. FRS and/or AI results falling outside of the ranges may be considered unlikely matches.

In some implementations, matching results are presented to the user (415). This operation, for example, corresponds to operation 604 of FIG. 6. The results may be presented as an ordered list of potential Facial Pairs for the user, for example based on a Facial Feature Similarity Score (FFS). Each pairing may be presented with the corresponding Face Similarity Similarity Score (FFS), for example shown as a percentage. Each pairing may include faces from the user, from the user and a different user, or the user and an archive image. If the faces are both in photos originating from the user, and the user has already assigned both faces to a single person profile, then those faces, in some embodiments, are excluded from being presented in the user's pairings, and no enhancement may be performed as the user has already identified the faces as the same person. If, instead, the faces in the pairing originated from the user's photos, but the faces are not part from the same profile or are standalone face(s) (e.g., not assigned to any profile), then the pairing may be presented to the user. In this circumstance, in some embodiments, no additional enhancement calculation is performed (e.g., metadata may not be available for enhancement).

In some implementations, a portion of the pairings are excluded from the matching results presented to the user. For example, face pairings with a less than a threshold (e.g., H %) Facial Feature Similarity (FFS), the pairing might not be shown to the user. H will be a positive number and from the set of real numbers.

In some embodiments, when at least one face has a Living Status noted as "Living or Unknown" (e.g., living status is unknown), the faces in the pairing may be treated equally to those marked as "Not Living or Deceased". The score (e.g., Match Probability) may be shared with the user(s) who loaded the photos containing the faces. However, in some embodiments, the metadata associated with "Living and/or Unknown" faces are not shared with the opposing user in the pairing unless permission is specifically granted by the user who submitted the photo, or if the paired photo is from an archive with publicly available metadata.

In some embodiments, users in a pairing may be alerted if it is unlikely the faces in the pairing are the same person, however, the users may be presented with these unlikely matches. Because some family features may be very dominant, for example, the method 400 may have identified a father/son or sister/sister as a potential match.

Returning to FIG. 3, in some embodiments, the FRS results (or enhanced FFS results), taking into consideration the direct comparison analysis for each pairing analysis, are returned to the application server(s)/service(s) 302 (316). Further, in some embodiments, the FRS results (or enhanced FFS results) are provided to the database(s) and/or server(s) for storage (318).

In some embodiments, when the one or more potential pairs identified in the FFS results, enhanced FFS results, and/or the FRS results indicate a threshold level of certainty (e.g., score or percentage similarity), the user 304 receives an indication from the application server(s) or service(s) that they have a potential facial pairing. In some implementations, the application server(s) or service(s) 302 sends a notification (320a, 320b) to the user's account via a mobile app 306 or web server 307, indicating the user 304 has facial pairs awaiting them. These notifications, for example, may be displayed (322a, 322b) by the mobile app 306 or web server 307 upon next login or action (324a, 324b) by the user 304.

In some embodiments, the pairing process results in the pairing confidence for at least a portion of potential pairings dropping below a threshold level (e.g., confidence percentage H %, score N). In these cases, the pairing may, or may not, be shown to the user 304 with the pairing. In some cases, the process 300 may select to not show these pairings to the user 304 as the possibility of a match is substantially (or significantly) low. In other cases, the process may provide user 304 the opportunity to view additional pairings below threshold level via a sort or filter option, for example.

In some embodiments, the pairings are displayed on a tab/page in a user's account. This may be a stand-alone tab/page or may be on a tab/page associated with a face or profile from the pairing, for example.

Returning to FIG. 6, to view the pairings and/or initiate the facial matching process, in some embodiments, a user selects the face or profile with the potential matched pairing to view information about the pairing (604). Examples of information displayed may include, but are not limited to, a digital image of the face the process identified as a potential match for the user's target face, a match probability (MP) (e.g., percentage, score) based on results from the pairing process, the user name of the original user who uploaded the face paired with the target face (e.g., User 1 will see the image and username from User 2 and User 2 will see the image and username from User 1), and/or some or all of the metadata associated with the opposing face in the pairing. Specific rules regarding "living" persons may apply to viewing metadata. In some embodiments, pairings may include pairings between faces in digital photos loaded by the same user.

In some embodiments, a version of the original photo is displayed with the face augmented (e.g., the face may be outlined by a colored shape). In some cases, the metadata associated with the original photo may also be displayed to the user(s) with the pairing.

In some embodiments when a new pairing occurs the user(s) may receive an indicator. Additionally, the faces in that pairing may be stored while waiting for the user(s) to view the pairing(s). Users may only receive the results and scoring for their target face versus the opposing face in a single pairing. If a target face is paired with multiple other faces, each pairing may be stored and displayed separately.

In some embodiments, users may be offered to apply treatments for the pairing (604). For example, a user may believe a pairing is a "Match" with their target face and may be offered a means to initiate the facial matching process (e.g., process 500 of FIG. 5A) by selecting a button, for example, which may be labeled "Yes", "Match" or "Accept," for example. In another example, a user may believe a pairing is a match with someone other than the target face. In these cases, a user may select "Someone Else," for example. This action may also initiate the facial matching process. In a further example, a user may believe a Pairing is not a "Match" with their face and may wish to indicate "No" or "Reject". This selection may move the paired image to a different tab/page. These paired images may remain on this page for the user to reassess at a different time. On this page, users may wish to apply treatments such as sort, filter, or ignore, for example. The selection of a command, such as "Ignore/Dismiss" for example, would remove the pairing from a user's account and cease to display that image and/or metadata. In some embodiments, "Ignoring/Deleting" an image removes the image and any associated data from a user's account. This process is solely to accommodate the user. The database may retain the image and any associated metadata. In an additional example, a user may be unsure if the pairing is a "Match" and may choose to move the pairing to a tab/page where they may return later. This action may include, but is not limited to, selecting a GUI control such as a button. This button may be called "Maybe", "Defer", "Perhaps" or "Unsure," as examples.

Figure 5A:
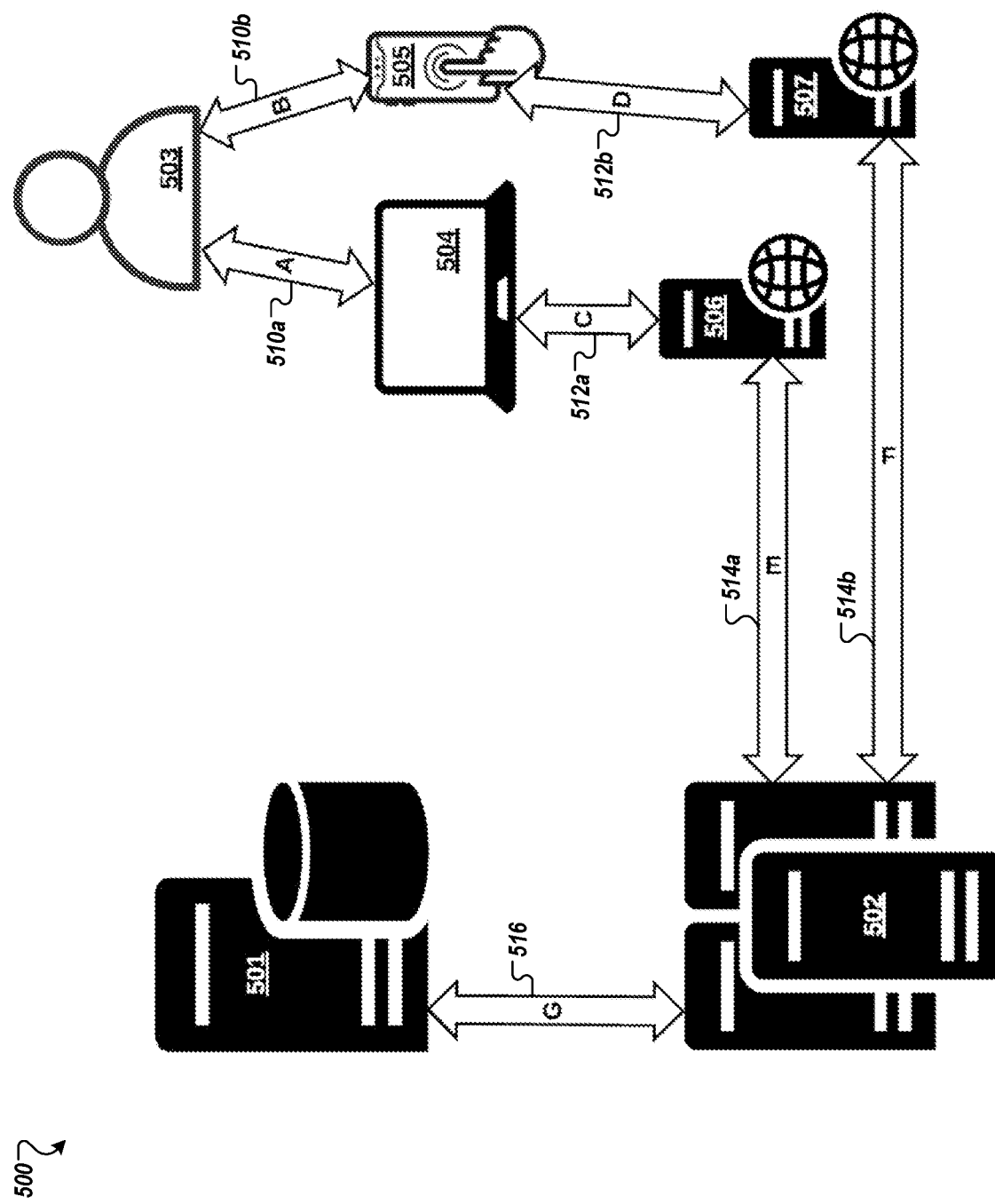
FIG. 5A is a flow diagram of an example facial matching process.
Figure 6:
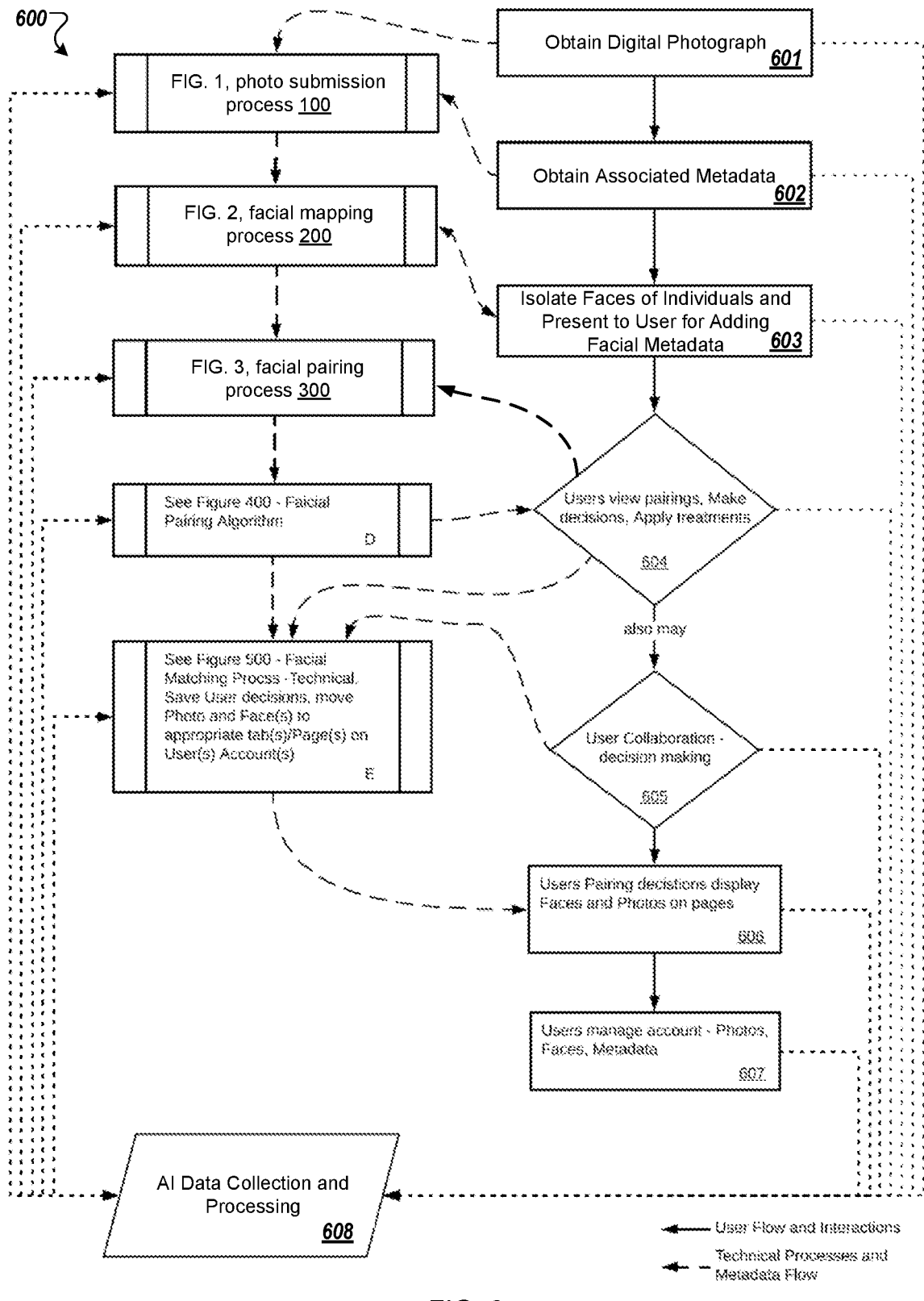
FIG. 6 is a flow diagram of an example platform flow.

When the user identifies a match, turning to FIG. 5A, the facial matching process 500, in some implementations, begins with a user 503 interacting with the platform (510a, 510b) to select a face to review the pairings associated with that face (503). The user 503, for example, may interact via a computing device 504 (e.g., a browser-based interface or web portal) and/or a mobile phone 505 (e.g., a mobile app interface). The interactions may be received (512a, 512b) at a web server or service 506 or a mobile application server or service 507, as appropriate to the device's interface.

In some implementations, when the user selects the face to review, the interaction is provided (514a, 514b) by the server or service 506, 507 to an application server or service 502 of the platform.

In some implementations, the application server or service 502 accesses (516) data and metadata related to the pairing. For example, when the user 503 clicks on a face in a pairing or otherwise selects a control configured to "Accept," a pop-up window may open where the images for each paired Face are presented along with the metadata associated with each face. This metadata could include, but is not limited to, First Name, Middle Name, Last Name, Nick/Other/Alternate Name, Birthdate. Birthplace, Death Date, Deathplace, Gender, Living Status, and Military service. Next to each metadata item may be a selection marker where the user 503 may choose to accept the metadata provided by the other user in the pairing. The user 503 may select those pieces of metadata they wish to accept, if any. If the user 503 makes selections from the opposing face's metadata and then "Accepts" the metadata, the selected metadata, in some embodiments, overwrites the metadata currently occupying those metadata fields for the user's own face/person's profile. Users, in some embodiments, may not alter the metadata for any other user (e.g., unless, in some configurations, users agree to share data, such as family members), even if they have a pairing with that user and know the other user's metadata to be false. When metadata is "accepted" and overwritten, if the user later wishes to alter the data, they may enter their own face's profile and make alteration. The action of "accepting," in some embodiments, provides the user a copy of the entire original photo of the other user, and the isolated face, for which their target face and photo was paired as well as any chosen metadata. In some implementations, the user 503 receives a modified version of the other user's photo, for example distorting region(s) of the image containing identifying features of any living face the user 503 has not been granted access to review.

In some embodiments, the "Accepted" photos and faces are retained on separate tabs/pages of the user's interface with the platform service or server 502. Each face/profile may have its own such tab/page to retain accepted matched photos and faces. Users may sort and filter these images by attributes just as they do their own images.

In some embodiments, a user may wish to "cancel" out of the Matching Process. This action may allow a user to exit the Matching Process without any treatments being applied to any faces or photos. This action will not share or exchange any metadata, nor port any copies of faces or photos to the user 503 from other users of the platform.

The user 503 may have entered the Matching Process, but after further review decide to "Reject" a given pairing as a "Match." This action, in some embodiments, moves the paired image, and any metadata associated with it, to a "Rejected/Declined" tab/page. Images may not be deleted as the user 503 may reconsider their rejection of that pairing at a later time. The user 503, in some embodiments, may sort and filter these images by attributes. In some embodiments, when the user 503 wishes to definitively "Ignore/Dismiss" the pairing, the user 503 is provided the opportunity to remove the pairing from their account.

For certain pairings, the user 503 may be unsure of the image and/or metadata and wish to hold the pairing for later review. In these cases, in some embodiments, the user may select "Maybe/Possibly". This moves the image and any associated metadata to the "Maybe" tab/page, for example. The user 503 may return to this tab/page at any time and restart the Matching Process. The user 503 may again "Accept" or "Reject" a face as a match or select "Someone Else" as a match.

The user 503 may believe the face to be of someone other than the target face. In such cases, in some embodiments, the user 503 may select "Someone Else". Family members often have similar facial features. If the user 503 believes the face presented is "Someone Else" such as a sibling, parent or cousin, the user 503 may make this selection. When this selection is made, for example, one or more data entry fields may appear, and the user 503 may begin to type the name of the person they believe to be shown in the image. Names already in the database 501, in some implementations, auto-populate during typing, responsive to partial entry, and the user 503 may select one of those Names/Profiles. If the face is of someone not currently a face or profile stored in the user's account in the database(s) or server(s) 501, then, in some implementations, a name may be entered to create a new profile and further metadata may be entered before a copy of the face, originating photo, and any metadata are moved to the user's account.

In some embodiments, the Matching Process may have been activated by the action of sharing one or more faces and/or photos with another user and the other user "Accepting" the image(s). In these cases, in some implementations, a process the same as, or similar to, selecting "Someone Else" may be presented to the user 503. This process will enable the user 503, for example, to receive a copy of the face, originating photo (or augmented version thereof, as discussed above in relation to living persons), and at least a portion of the metadata associated with those images (e.g., including the metadata corresponding to the matched face and additional faces the user 503 has access to). The receiving user 503 may accept any, or all of, the metadata and/or provide their own metadata.

In some embodiments, as the user 503 interacts with the platform 502 via the mobile application 505 or web application/desktop portal 504, user actions are captured by the application server or service 502 and logged in a user history by the database(s) or storage server(s) 501.

As discussed above, the user 503 or another user may submit a photo to the platform 502 containing one or more images of living persons. Faces for persons indicated by a user as "Living" may receive special treatment. Metadata for "Living" persons may only be displayed to the user who uploaded that image. Users who have a pairing with a face indicated as "Living", and wishes to make a match with that image, may do so, but those users may be limited to receiving the face and photo images only. Metadata for "Living" persons may, or may not, be shared with permission from the user who originally loaded the face. Users may be provided the opportunity to request permission to view and/or merge the metadata associated with a "Living" person's facial image from the originating user. Image originators may grant or deny the request for the metadata. For example, the user who originally submitted the face noted as "Living" may receive an alert that another user wishes to view and/or receive their "Living" person's metadata. In these cases, the user may view the request along with, but not limited to, the requestor's username, paired face, and message sent by the requesting user.

Figure 5B:
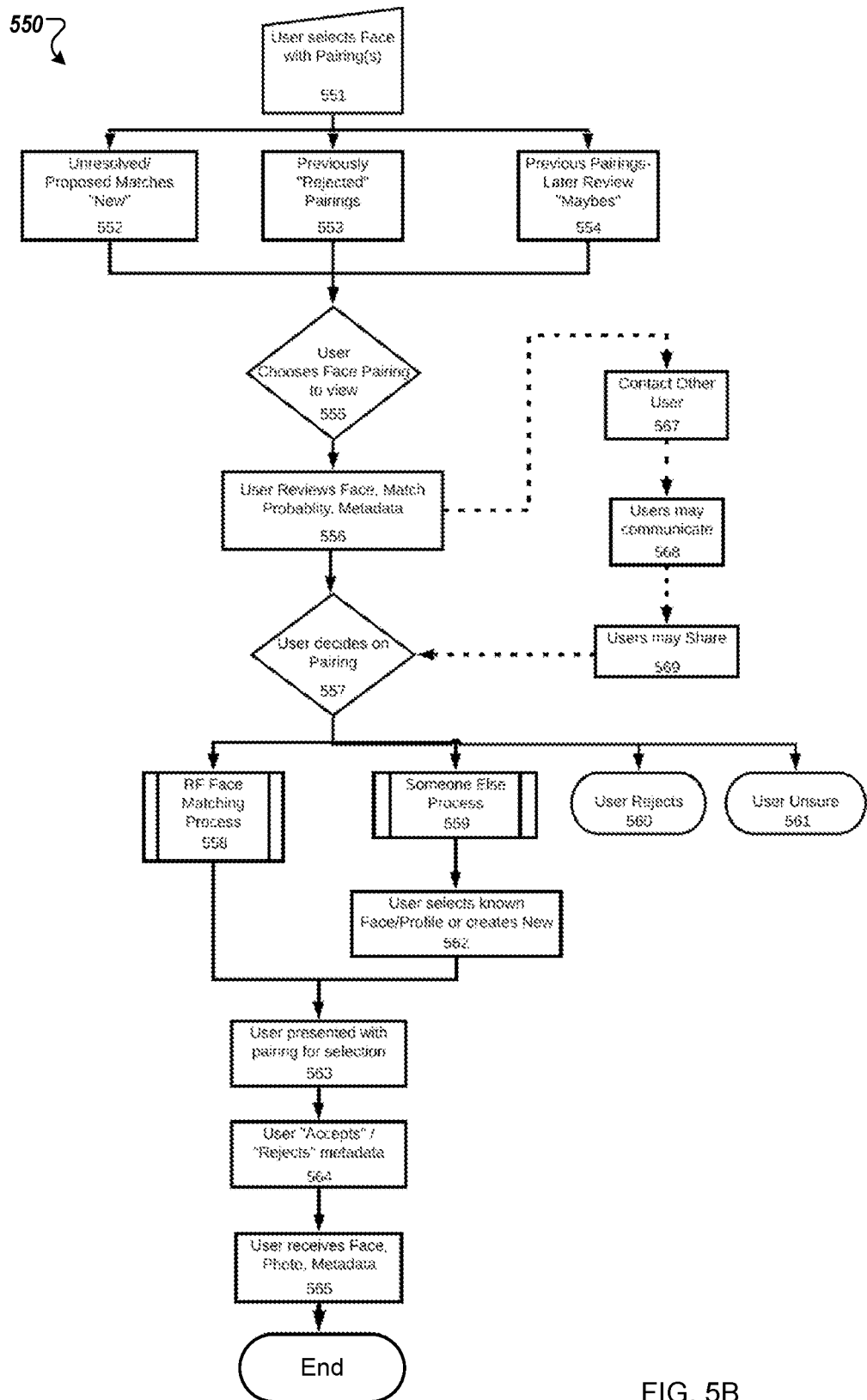
FIG. 5B is a flow chart of an example method for facial pairing and matching.

Turning to FIG. 5B, an example process 550 demonstrates steps that may be taken by the user 503 in interfacing with the platform 502 described in relation to FIG. 5A.

In some implementations, the process 550 begins with the user 503 selecting to review facial pairings (551). The user 503 may select a target face (e.g., other user's face) indicated to view the pairing. In another example, the user 503 may click on, or otherwise select, an indicator which may display a menu of all of that user's pairings, and the user 503 may select one of the target faces shown. In some embodiments, selecting a target Face causes display of the pairing made for the target face on a dedicated page, section, or tab. The pairing options, for example, may be listed in ordered fashion with the highest likelihood of matching (e.g., highest percentage of similarity listed first and the least likely listed last). In some cases, users may filter and sort the presentation their pairings.

In some embodiments, the pairings from which the user 503 makes the selections are included in a set of unresolved/proposed matches (552). For example, the remaining unselected pairings may remain in a tab, page, or other grouping as new (unconsidered or proposed) matches.

When the user 503 selects to view faces with pairings (551), in some implementations, the user 503 is presented with treatment options. These options may be, but are not limited to, "Reject", "Maybe". "Accept" or "Someone Else." In some embodiments "Reject" may indicate the user 503 does not believe the presented face represents a potential match. If the user 503 selects this treatment, the face may be tagged as "Rejected" (560) and may be retained in a "Rejected List" (553) (e.g., tab, page, or other grouping). In some cases, the user 503 may recall the "Rejected List" as needed, review the match information provided with the image, and retain or change the status. Changing the status from "Rejected" to "Accepted," for example, may activate other treatments such as the Facial Matching Process.

Selection of "Maybe" indicates a user may be unsure if this face represents a potential match. If the user 503 selects this treatment, in some embodiments, the face is tagged as "Maybe" (561) and may be retained in a "Maybe List" (554) (e.g., tab, page, or other grouping). In some cases, the user 503 may recall the "Maybe List" as needed, review the match information provided with the image and retain or change the status. Changing the status from "Maybe to Rejected" (561), for example, may activate other treatments such as moving the Paired Face and associated data to a "Rejected" tab/page (e.g., from 554 to 553).

In some implementations, the user 503 chooses a face pairing to view from the new matches 552, the previously rejected pairings 553, or the previously identified maybes 554 (555) and reviews the face (556). In some embodiments, a user is given the option to click on the paired face, or perhaps some information indicator to view additional metadata that may be attached to the paired face and to view the originating photo from which the face was isolated. In some cases, the paired face may be augmented, such as highlighted by a colored shape as previously described. In some embodiments, in addition to the percent of likelihood of being a match (MP), other data is displayed along with an image of the face being paired such as, in some examples, Username for the other user in the pairing, date the pairing was made, possible name of the paired face, as well as various controls for making selections.

In some embodiments, for paired faces corresponding to a Living Status as "Living" or "Unknown" where the photo is indicated to be less than 100 years of age, certain metadata elements are suppressed to protect the privacy of a person whose image is being paired. In some cases, a notice that the face shown in the pairing may be living may be displayed or otherwise an indication that the metadata is private may be provided to the user 503. In these embodiments, a user who is not the original submitter of the image may request the information from the user who submitted the image.

In some implementations, the user 503 decides on a pairing (557). In some embodiments "Accept" may indicate a user may believe they have found a match for the target face.

In some implementations, when the user 503 "Accepts," the user 503 enters a matching process (558) and the user 503 is presented with the pairing for selection of treatments (563). In some embodiments, the matching process allows the user 503 the opportunity to import all, none or any individual component of the metadata associated with the paired face which may be made available to them. In some embodiments, a user may be presented with a selectable menu of the metadata associated with the face shown in the paired image.

In some implementations, the user 503 moves the metadata into a profile in the user's account (565). After selecting the desired metadata, and indicating an affirmation, possibly in the form of an "Accept" button, the metadata selected may be copied and moved to the corresponding metadata fields in the user's target face/profile. This action may overwrite any metadata the user previously had written in the fields. In addition, a copy of the image of the face may be moved to a tab/page on the target face's profile for retention. The unique facial identifier (UFI) associated with the face may be copied with the image and may remain with the image. In addition, a copy of the photo from which the paired face was extracted (or an augmented version thereof, as discussed above) and its UPI may be moved to a tab or page on the user's account for the storing of acquired photos. In some cases, these acquired faces and photos may be sorted and filtered in the same manner as faces and photos loaded by the user themselves.

In some implementations, a someone else process is entered (559) where the pairing is identified as not a match, but a user believes the target face matches a different person or profile. In some embodiments, a user may assign this face to one of their existing profiles and choose to import all, none or any individual component of the metadata presented with the face shown in the paired image (562). After selecting the desired metadata (564), and clicking an "affirmative button", the metadata selected may be copied and moved to the corresponding metadata fields for the user's "Someone Else" face/profile (565). This action may overwrite any metadata the user previously had written in the fields. In addition, a copy of the image of the face may be moved to a tab or page, such as a "Someone Else" Face Profile, for retention (565). The UFI may be copied with the image and may remain with the image. In addition, a copy of the photo from which the paired face was isolated and its UPI, may be moved to a tab or page on the user's account for the storing of acquired images. In some cases, these acquired faces and photos may be sorted and filtered in the same manner as faces and photos loaded by the user themselves.

In some implementations, a user may not have additional image(s) of, nor a profile created for, the person they believe is in the paired image (e.g., the image being presented may be of a close relative such as a father, brother, cousin, or someone else with facial features that strongly match the target face) (562). In such cases users may be presented the opportunity to create a new profile to accompany this new image. In such cases, a user may choose to accept all, none or components of the metadata presented to them via the originating user (564), or they may be given the option of supplying their own metadata for the face at that time. The accepted face and its UFI as well as the photo and its UPI may be moved to the users account (565) and may appear on their corresponding tabs or pages or may be placed on a special page or tab designated for these images. These images may be treated in the same manner as "Accepted" faces and photos.

Returning to FIG. 6, in some embodiments, users may choose to enter, make additions, delete, or otherwise alter the metadata imported with faces and photos they accept (607). Once a user has accepted a face or a photo, they may alter the metadata they received with the image. In some embodiments multiple users may have copies of the same face and/or photo. In such cases, each user will maintain their own metadata for the image. Alteration of metadata made by one user will not affect or change the metadata retained by other users for that image.

In some implementations, machine learning and/or artificial intelligence is applied to the actions of "Accept", "Reject", "Maybe" or "Someone Else" (608). These actions may be analyzed, for example, to determine the significance of the action (e.g., why was a pairing determined to be, or not to be, a Match). All aspects of the pairing may be dissected and analyzed, including, but not limited to, FRS results, FRS algorithms, FPA results, user supplied Metadata, user actions, and user profile information (e.g., user's age, user's geographic region, user's primary language, etc.). The analysis of real results (e.g., truth data) may determine the structure of the AI being applied to the analysis and may be utilized to improve the pairings presented to the users. For example, over time, the application of AI and the machine learning may learn the progression of a person's face throughout their lifetime, thereby improving pairing results for users. The machine learning and/or AI algorithms may be performed in real-time (e.g., as decisions made by the users related to accepted, rejected, and "someone else" decisions entered through the user interface). In other embodiments, the user action history logs stored in the database(s) and/or server(s) of the platform may be accessed periodically to batch process new truth data (e.g., daily, weekly, bi-weekly, etc.). In some implementations, the real-time decisions and/or history log includes a shared series of actions involving collaboration. For example, if two users each "Reject" multiple pairings of faces shared between those users as not matches (e.g., face 1 of each pairing belongs to one of user 1's photos and face 2 of each pairing belongs to one of user 2's photos or vice-versa), the AI may learn to demote future pairings between these users.

In some implementations, the user decides to collaborate with one or more users (605). Users with pairings may choose, or not choose, to collaborate. In some embodiments, users may choose to share photos, faces, and/or metadata through a system provided by the platform. This targeted collaboration may produce matches and/or other data important to, but not limited to, the Facial Pairing Algorithm (FPA). AI tracking and analysis of users sharing photos, faces, and/or metadata, as in operation 608, can contribute meaningfully to future pairings and/or matches.

In some embodiments, users are provided the ability to share one or more faces and/or photos which may or may not have been paired. This process may be user activated with, possibly, a button or other control positioned on or near a face or photo, and/or a widget may be provided to facilitate the sharing of photos, faces and/or metadata.

In some embodiments, the user sharing the face/photo may choose to share metadata with another user or keep it private, as in the case of a Living person being in the image to be shared.

In some embodiments, a user receiving a shared face/photo and may be required to "Accept" the image(s) which may activate a process the same as, or similar to, selecting "Someone Else" in the facial matching process. Completing this process may enable the user to receive a copy of the face, originating photo, and any metadata associated with those images. The receiving user may "accept" any, or all, of the metadata or provide their own.

Turning to FIG. 5B, in some implementations, a user contacts the other user regarding a potential collaboration (567). In some embodiments a user may wish to communicate with the other user in the pairing (568) to, perhaps, seek out additional information about the other user's face in the pairing, for example. The platform may allow users to collaborate and/or communicate on the pairing via a widget, applet, or service provided by the platform. Collaboration of this kind is more targeted than crowdsourcing as users may be more likely to have common interests, information, or relatives, for example. Collaboration may be performed in real-time (e.g., as both users are logged into the platform) and/or asynchronously (e.g., as messages provided to another user regarding a potential collaboration).

In some implementations, user share information with another user of the platform (569). In some embodiments, users may wish to share paired or unpaired faces, photos, and/or any associated metadata, with other users. Each face and/or photo a user uploads to their account will be sharable with a control such as a "button" that may or may not be labeled "Share". This option, for example, allows users to choose to share a face, a photo, and/or associated metadata with another user. When a user selects this option, they may also send to the receiving user a message or other notes.

In some implementations, the receiving user decides on the potential pairing or merging of information (e.g., metadata) as proposed by the sending user (557). In some embodiments, a user receiving a face and/or photo, with or without metadata, may be required to "Accept" or "Reject" the shared image and associated message after opening/viewing the shared image.

In some implementations, if a user chooses to "Accept" a shared image and its associated metadata, the user is presented with a version of the Facial Matching Process (558) before the image and metadata are copied to the receiving user's account. These images may be stored and treated just as any other "Match" made through the Facial Matching Process.

In some implementations, if a user chooses to "Reject" (557) a shared image, the image and any associated metadata are not copied into the receiving user's account.

In some embodiments, a user may wish to share multiple photos (e.g., all photos and metadata associated with a profile or person). In these cases, the receiving user may be required to "Accept" or "Reject" each Face/Profile and/or Photo received.

Returning to FIG. 6, in implementations, the platform Artificial Intelligence (AI) and/or machine learning is applied to evaluate the actions of users and the faces, photos, and metadata they share between each other through their collaborative efforts (608). AI may help enhance the pairing process by reevaluating the data received from the FRS, for example, to determine why a pairing was made, or was not made. In other cases, AI evaluation may determine how the structure of a person's face changes of their lifetime. This information may help create pairings when there may not be photos for a span of time during a person's life.

In a first illustrative example, a user has photos of their Aunt when that Aunt was ages 10, 50 and 70. This user creates a profile for their Aunt and loads the photos in that profile. There are significant gaps in time between the photographs. Now, let us add to this example by adding a user who may have known the Aunt during the missing years, and may further have photos of the Aunt from those missing years, say for ages 30, 35 and 42. Neither user has photos of the Aunt from the same period of the Aunt's life as the other user, but with AI assistance pairings may be made. The AI may utilize the images from the first user to determine what the Aunt may have looked like during the missing years, while AI may help, in the second user's case, to determine what the Aunt may have looked like prior to, and/or after the ages she appears in the second user's photos. When comparing the results from the AI analysis, the platform and/or processes may find additional pairings the FRS did not discover.

In a second illustrative example, a third user has many photos of the Aunt throughout her entire lifespan. AI applied to this user's photos may map the aging progression of the Aunt through her life, therefore materially adding to the comparison being done between the photos of the other two users. By utilizing AI and machine learning to cross-connect users who have matches or may be otherwise collaborating, the accuracy and efficiency of creating pairs, and ultimately matches, may be significantly improved.

In some implementations, AI, machine learning, and/or other statistical learning analysis is applied to metadata supplied by users and/or generated by the FRS (608). Machine learning may be utilized to recognize similar metadata. This analysis may be used to enhance pairings by seeking similarities or dissimilarities in metadata. Furthermore, this analysis may be then applied to results from the FRS to include or exclude results from potential pairings. In an illustrative example, two users have faces with profiles where the metadata shows both faces are named John Smith. Further, the FPA results show a significant facial similarity and therefore on multiple occasions pairings of these faces have been presented to the two users. For this example, let us assume the users are unknown to each other. These users may collaborate to discover that they are relatives previously unknown to each other. The actions these users take may be of special interest to the AI algorithms. If the users create matches with the pairings they are presented, these matches may be of more value than other matches because these users collaborated in making their decisions. The AI algorithms may then promote any future pairing between these users. In another aspect, the users may "Accept" certain pairings but assign them to "Someone Else" or create a new profile for some of the face pairings they collaborate on. The AI algorithms may then learn that there may be multiple John Smith's in this extended family. If instead, the users "Reject" pairings, then the AI may learn that these two users are likely not connected and then may demote pairings made between these users or not show the pairings at all.

In some implementations, AI, machine learning, and/or other statistical learning analysis is applied to adjust the FPA, alter the scoring, similarity, and/or frequency of a given set of results to enhance the overall process. In addition, AI may be utilized to identify trends, user actions, and machine consistencies and/or irregularities leading to changes in, but not limited to, pairing, scoring, the application, the database, the user experience, the website, and/or the mobile application. AI may also be used in an advanced form where changes are made dynamically and applied to individual users or groups of users (e.g., close relatives), all users or categories of users (e.g., regional, archive-related, etc.), and/or the platform as whole. In illustration, if user 1 looks at every pairing presented to her, but user 2 only looks at pairings with a matching percentage over 80%, the AI may then be applied and individualized to each user's experience by showing them the pairings in a manner suited to their viewing style. AI may not reveal pairings under 80% to user 2 without user 2 taking some action such as selecting a control to reveal additional matches.

In some implementations, the user organizes and/or manages digital photographs in their account (607). In some embodiments, users may wish to move, sort, filter or otherwise organize their photos. Users may sort and/or filter their photos by, but not limited to, metadata attributes they provided (e.g., photo, name), and/or sort and filter attributes provided by the platform and/or process.

In some embodiments, users may wish to group photos by attributes (e.g., name or date). Users may create folders to hold photos. A widget may be provided to enable users to create and name folders. Users may, for example, move photos from one folder to another folder, remove a photo from a folder and place it on a "Photos Home" tab/page, or never place a photo in a folder. In embodiments where a user chooses to move a photo in or out of a folder, or otherwise apply one or more treatments, the metadata. UPI(s) for that photo moves with the photo regardless of the grouping or placement. Photos within folders may also be sorted and filtered according to allowable attributes.

In some embodiments, photo metadata may be entered and/or modified at any time by selecting the photo and making the modifications in the appropriate metadata field(s). The modification, or addition, of metadata does not alter the UPI(s).

In some embodiments, users may wish to view only the image of a photo without the associated metadata. Users may be provided the option to view only the photo. In some cases, users may also enlarge the photo for better viewing.

In some embodiments, users may wish to "delete" a photo. Photos may be "deleted" from the users account, however, in some embodiments, once a photo is loaded into the database, it will not be removed from the database. This feature protects any user who may have made a pairing or match with the photo. The metadata, UPI(s) are also retained with the photo. Photos deemed to contain pornographic or other inappropriate images may be permanently deleted.

In some embodiments, users may wish to move, sort, or otherwise organize their faces. Users may sort and/or filter their faces by, but not limited to, the metadata attributes they provided (e.g., name) and/or those provided by the platform.

In some embodiments, users may wish to group their faces. One form of grouping may be by collecting faces of a person known (e.g., named) or unknown to the user, but are otherwise known to be the same person. Users may create a profile for an individual in one or more photographs, and then group one or more faces under the same profile. Other examples of a grouping may be the collection of faces and/or profiles for members known to be from the same family or collecting all the faces unknown to a user in one folder.

A profile may be a grouping of at least one face and, may have metadata associated with that face or grouping of faces. Users may associate multiple faces from multiple photos with a profile if they believe the faces are of the same individual. In some embodiments, all faces attached to a profile are associated with the same metadata, in other embodiments, certain metadata may only be associated with a corresponding age range. In a first example, tattoo metadata may only be associated with an age (or estimated age range) at which the individual obtained the tattoo (or, in some circumstances, between obtaining the tattoo and having the tattoo removed). In other examples, amputations, scars, piercings, facial hair, and/or baldness (e.g., alopecia, chemotherapy-induced, etc.) may be associated with starting age and, in some circumstances, an end age. In other words, certain metadata may only correspond with a portion of the faces of a profile corresponding to the age range during which that metadata is applicable. Users, in some embodiments, may select one of the isolated faces in the profile to act as a representation profile picture for that face/person. Profile metadata may be edited or added to by the user. In some embodiments, users may remove a face from a profile and/or move a face to a different profile.

In some instances, users may sort and/or filter individual faces and/or profiles by, but not limited to, attributes they provide and/or provided by the platform, such as Name, Date, Place and Facial Hair. An individual profile may be affiliated with many photographs. These photos may also be sorted and/or filtered by attributes such as, but not limited to, Date and Place. All metadata associated with a profile moves with the profile as it is sorted filtered or otherwise grouped.

In some embodiments a user may discover they have created two or more profiles for the same face/person. Profiles may be merged into a single profile. In some cases, this process may be launched by dragging and dropping one profile onto another profile. In other cases, it may be activated by the use of a widget. Faces within a multi-face profile will maintain their own UFI(s).

Figure 7:
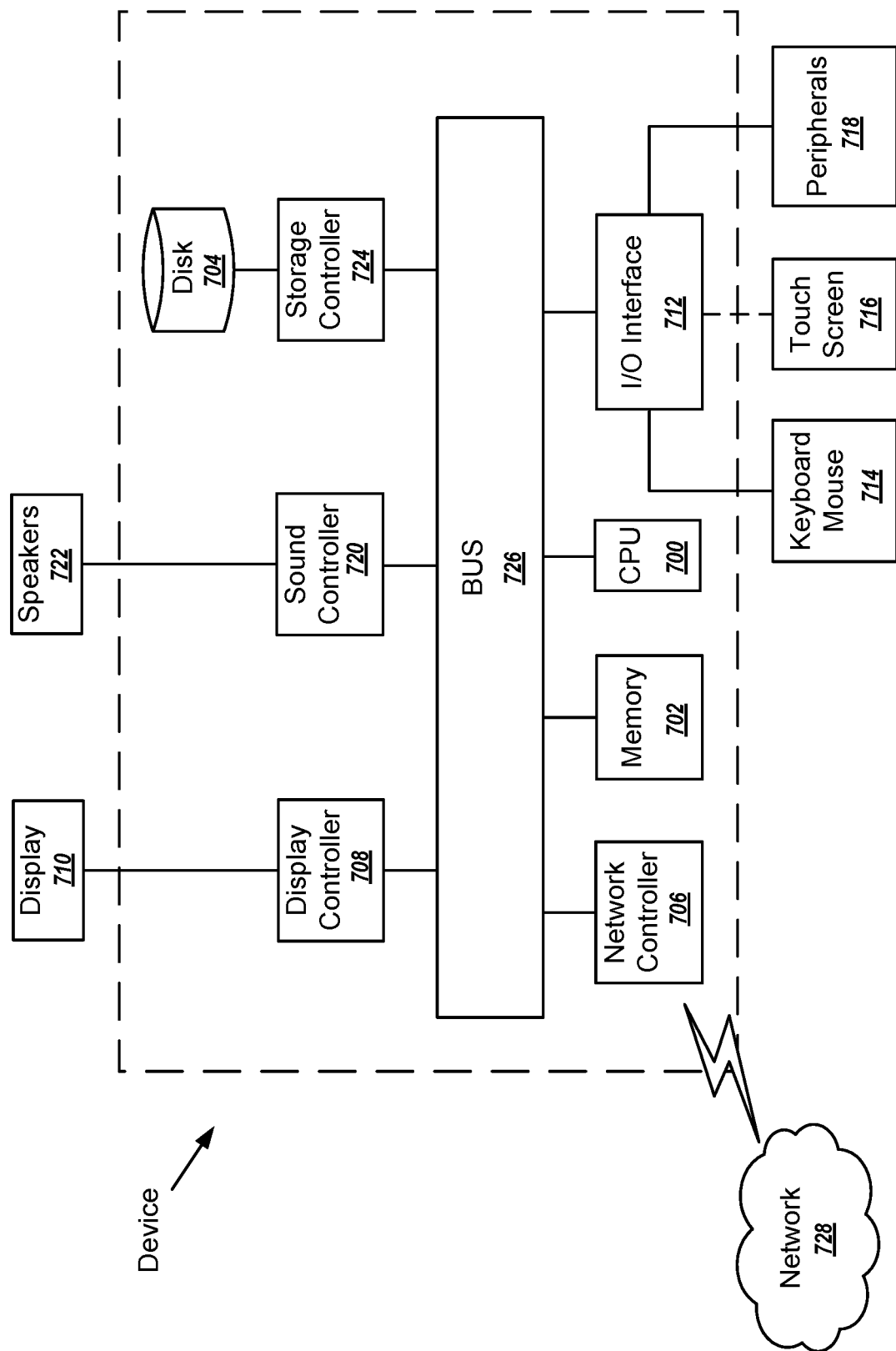
FIG. 7 is a block diagram of an example computing device.

Next, a hardware description of the computing device, mobile computing device, or server according to exemplary embodiments is described with reference to FIG. 7. The computing device, for example, may represent one or more computing systems supporting the facial pairing and matching platform and/or the users' mobile, laptop, or other computing devices, such as devices 102 and 103 of FIG. 1, devices 205 and 206 of FIG. 2, devices 305 or 306 of FIG. 3, and/or devices 504 or 505 of FIG. 5A. In FIG. 7, the computing device, mobile computing device, or server includes a CPU 700 which performs the processes described above. The process data and instructions may be stored in memory 702. The processing circuitry and stored instructions may enable the computing device to perform, in some examples, the methods described above and illustrated in the flow charts, such as the flow diagram 100 of FIG. 1, the flow diagram 200 of FIG. 2, the flow diagram 300 of FIG. 3, the method 400 of FIG. 4, the flow diagram 500 of FIG. 5A, the method 550 of FIG. 5B, and/or the method 6(x) of FIG. 6. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 704, in some examples, may store the contents of the photos, profiles, user accounts, and/or metadata described above as described in relation to, in some examples, the database(s) or server(s) 107 of FIG. 1, the database(s) or server(s) 201 of FIG. 2, the database(s) or server(s) 301 of FIG. 3, and/or the database(s) or server(s) 501 of FIG. 5.

Further, a portion of the claimed advancements may be provided as a utility application, background daemon, or component of an operating system, or combination thereof, executing in conjunction with CPU 700 and an operating system such as Microsoft Windows, UNIX, Solaris, LINUX, Apple MAC-OS and other systems known to those skilled in the art.

CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device, mobile computing device, or server in FIG. 7 also includes a network controller 706, such as an Intel Ethernet PRO network interface card from Intel Corporation of America, for interfacing with network 728. As can be appreciated, the network 728 can be a public network, such as the Internet, or a private network such as an LAN or WAN network, or any combination thereof and can also include PSTN or ISDN sub-networks. The network 728 can also be wired, such as an Ethernet network, or can be wireless such as a cellular network including EDGE, 3G, 4G, and 5G wireless cellular systems. The wireless network can also be Wi-Fi. Bluetooth, or any other wireless form of communication that is known. The network 728, for example, may support communications between the platform and various user devices and/or the platform and a third-party facial recognition service. In some examples, the network 728 may enable communications between the devices 102, 103 and the servers/services 104, 105 of FIG. 1, the devices 205, 206 and the servers/services 207, 208 of FIG. 2, the devices 305, 306 and the servers/services 307, 308 of FIG. 3, and/or the devices 504, 505 and the servers/services 506, 507 of FIG. 5A.

The computing device, mobile computing device, or server further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface 712 also connects to a variety of peripherals 718 including printers and scanners, such as an OfficeJet or DeskJet from Hewlett Packard. The display controller 708 and display 710 may enable presentation of the user interfaces supporting photo upload, facial pairing, and facial matching.

A sound controller 720 is also provided in the computing device, mobile computing device, or server, such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA. EISA, VESA, PCI, or similar, for interconnecting all of the components of the computing device, mobile computing device, or server. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Aspects of the present disclosure may be implemented by software logic, including machine readable instructions or commands for execution via processing circuitry. The software logic may also be referred to, in some examples, as machine readable code, software code, or programming instructions. The software logic, in certain embodiments, may be coded in runtime-executable commands and/or compiled as a machine-executable program or file. The software logic may be programmed in and/or compiled into a variety of coding languages or formats.

Aspects of the present disclosure may be implemented by hardware logic (where hardware logic naturally also includes any necessary signal wiring, memory elements and such), with such hardware logic able to operate without active software involvement beyond initial system configuration and any subsequent system reconfigurations (e.g., for different object schema dimensions). The hardware logic may be synthesized on a reprogrammable computing chip such as a field programmable gate array (FPGA) or other reconfigurable logic device. In addition, the hardware logic may be hard coded onto a custom microchip, such as an application-specific integrated circuit (ASIC). In other embodiments, software, stored as instructions to a non-transitory computer-readable medium such as a memory device, on-chip integrated memory unit, or other non-transitory computer-readable storage, may be used to perform at least portions of the herein described functionality.

Various aspects of the embodiments disclosed herein are performed on one or more computing devices, such as a laptop computer, tablet computer, mobile phone or other handheld computing device, or one or more servers. Such computing devices include processing circuitry embodied in one or more processors or logic chips, such as a central processing unit (CPU), graphics processing unit (GPU), field programmable gate array (FPGA), application-specific integrated circuit (ASIC), or programmable logic device (PLD). Further, the processing circuitry may be implemented as multiple processors cooperatively working in concert (e.g., in parallel) to perform the instructions of the inventive processes described above.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
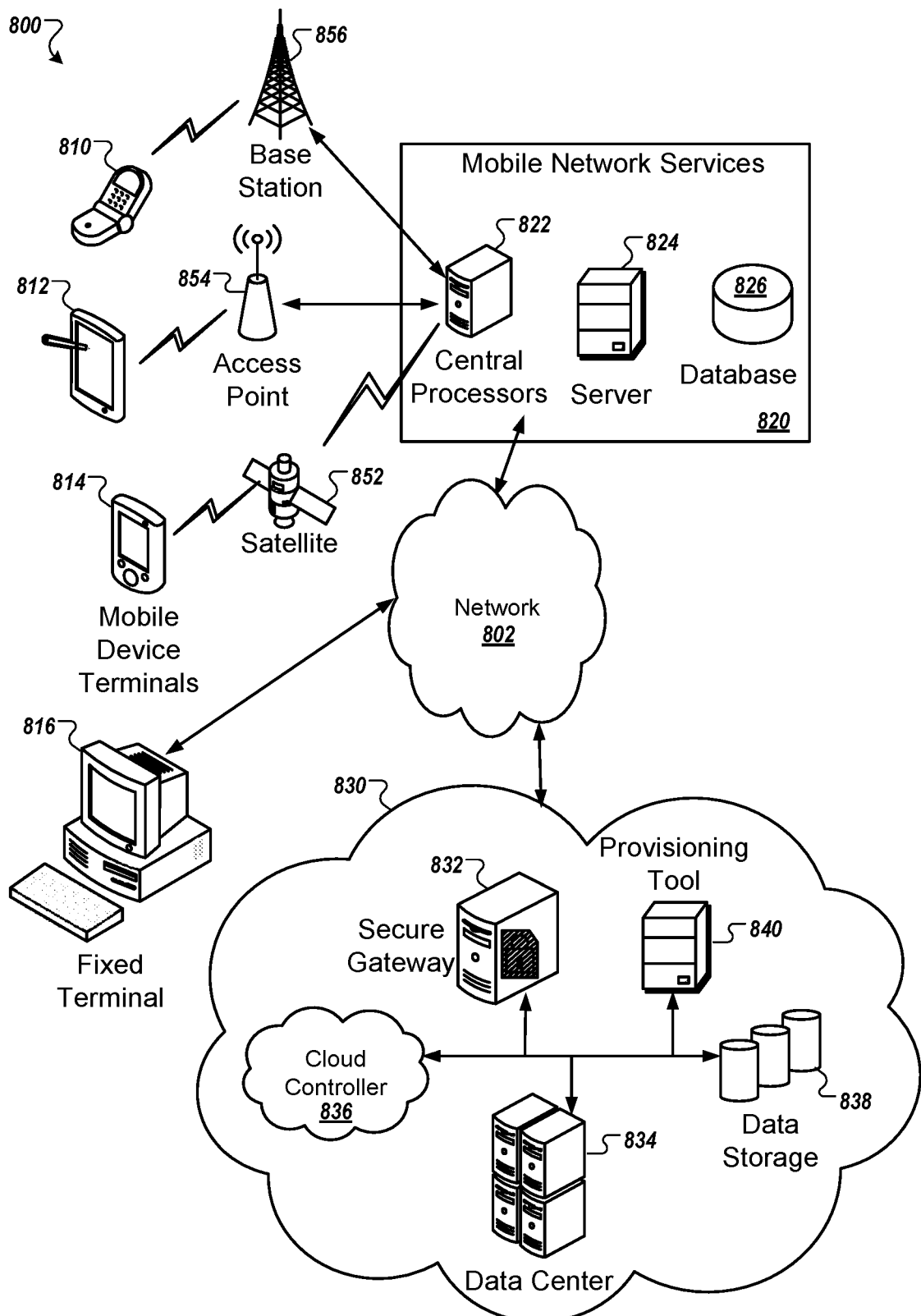
FIG. 8 is a block diagram of an example computing network.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 830, such as Google Cloud Platform™ to perform at least portions of methods or algorithms detailed above. The processes associated with the methods described herein can be executed on a computation processor, such as the Google Compute Engine by data center 834. The data center 834, for example, can also include an application processor, such as the Google App Engine, that can be used as the interface with the systems described herein to receive data and output corresponding information. The cloud computing environment 830 may also include one or more databases 838 or other data storage, such as cloud storage and a query database. In some implementations, the cloud storage database 838, such as the Google Cloud Storage, may store processed and unprocessed data supplied by systems described herein. For example, the photos, metadata, profiles, user account information, and other user files and data structures may be stored in a database structure such as the databases 838.

The systems described herein may communicate with the cloud computing environment 830 through a secure gateway 832. In some implementations, the secure gateway 832 includes a database querying interface, such as the Google BigQuery platform. The data querying interface, for example, may support access by users seeking photos and/or profiles of individuals based on key terms.

The cloud computing environment 830 may include a provisioning tool 840 for resource management. The provisioning tool 840 may be connected to the computing devices of a data center 834 to facilitate the provision of computing resources of the data center 834. The provisioning tool 840 may receive a request for a computing resource via the secure gateway 832 or a cloud controller 836. The provisioning tool 840 may facilitate a connection to a particular computing device of the data center 834.

A network 802 represents one or more networks, such as the Internet, connecting the cloud environment 830 to a number of client devices such as, in some examples, a cellular telephone 810, a tablet computer 812, a mobile computing device 814, and a desktop computing device 816. The network 802 can also communicate via wireless networks using a variety of mobile network services 820 such as Wi-Fi, Bluetooth, cellular networks including EDGE, 3G, 4G, and 5G wireless cellular systems, or any other wireless form of communication that is known. In some examples, the wireless network services 820 may include central processors 822, servers 824, and databases 826. In some embodiments, the network 802 is agnostic to local interfaces and networks associated with the client devices to allow for integration of the local interfaces and networks configured to perform the processes described herein. Additionally, external devices such as the cellular telephone 810, tablet computer 812, and mobile computing device 814 may communicate with the mobile network services 820 via a base station 856, access point 854, and/or satellite 852.

While certain embodiments have been described, these embodiments have been presented by way of example only and are not intended to limit the scope of the present disclosures. Indeed, the novel methods, apparatuses and systems described herein can be embodied in a variety of other forms: furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for assisting users in identifying unknown individuals in photographs, the system comprising:
a non-transitory computer readable data repository, comprising
a plurality of mapped images, wherein
each mapped image of the plurality of mapped images is associated with
a unique photo identifier, and
a unique facial identifier for each face of at least one face represented in the respective mapped image,
each image of at least a portion of the plurality of mapped images is associated with one or more attributes of the respective mapped image, and
each image of the plurality of mapped images corresponds to a respective user of a plurality of users of a genealogy research platform,
a plurality of face profiles each created by a given user of the plurality of users of the genealogy research platform, each face profile comprising one or more demographic attributes of a respective individual, wherein
each face profile of the plurality of face profiles is associated with at least one unique facial identifier of one mapped image of the plurality of mapped images; and
a plurality of instructions stored to a non-transitory computer readable medium, wherein the instructions, when executed on processing circuitry, cause the processing circuitry to
identify, in a target image of the plurality of mapped images provided by a requesting user of the plurality of users, a target face,
conduct a facial analysis comparison of the target face with each face in a remainder of faces represented in the plurality of mapped images to obtain, for each face, a respective likelihood of a pairing with the target face, wherein
each face corresponds to a respective facial identifier of each unique facial identifier in the remainder of faces represented in the plurality of mapped images,
compare, for each combination of a plurality of combinations of the target face and a respective face of a plurality of potentially matching faces of the remainder of faces, target attributes of a face profile of the target face to comparator attributes of a face profile of the respective face, wherein comparing comprises
for each attribute of the target attributes matching the attribute of the comparator attributes, increasing the respective likelihood of the pairing, and
for each attribute of the target attributes not matching the attribute of the comparator attributes, decreasing the respective likelihood of the pairing, and
prepare, for presentation to the requesting user based at least in part on the respective likelihood of the each combination of the plurality of combinations, a graphical user interface comprising an image of each face of at least a portion of the potentially matching faces for consideration by the requesting user as a match to the target face.

2. The system of claim 1, wherein the one or more attributes of a given face profile of the plurality of face profiles comprises a name, a birthdate, a birthplace, a death date, a death place, a biological gender, a living status, and/or a military status.

3. The system of claim 1, wherein the one or more attributes of a given image of the plurality of mapped images comprises a photo date, a photo location, and/or an identity of a photographer.

4. The system of claim 1, wherein the graphical user interface further comprises at least a portion of matching attributes between the target attributes and the comparator attributes of at least some of the faces of the portion of the potentially matching faces.

5. The system of claim 4, wherein the portion of the matching attributes are suppressed from presentation in the graphical user interface for the potentially matching faces comprising an attribute of life status of living or unknown beyond presenting the life status.

6. The system of claim 1, wherein the image of each face is isolated from a respective mapped image of the plurality of mapped images containing the face such that the respective mapped image is not viewed by the requesting user.

7. The system of claim 1, wherein the respective likelihood of the pairing is represented as a percentage similarity between the target face and a given face.

8. The system of claim 1, wherein preparing the graphical user interface comprises arranging the image of each face of the portion of the potentially matching faces in a ranked order from most likely match to least likely match.

9. The system of claim 1, wherein:
preparing the presentation comprises presenting control elements for selecting a particular face of the portion of the potentially matching faces as the match; and
upon selection of a given face corresponding to a life status of deceased as the match, the instructions, when executed on the processing circuitry, cause the processing circuitry to enable access to the requesting user of the plurality of attributes of a given face profile of the plurality of face profiles corresponding to the given face.

10. The system of claim 9, wherein, upon selection of the given face as the match, the instructions, when executed on the processing circuitry, cause the processing circuitry to enable access to the requesting user of a mapped image of the plurality of mapped images containing the given face.

11. The system of claim 1, wherein conducting the facial analysis comparison comprises providing the target face and each face in the remainder of faces to a facial recognition service.

12. The system of claim 1, wherein:
increasing the respective likelihood of the pairing comprises increasing the respective likelihood by a value or percentage weighted according to a relative importance of the respective attribute; and
decreasing the respective likelihood of the pairing comprises decreasing the respective likelihood by the value or percentage weighted according to the relative importance of the respective attribute.

13. The system of claim 1, wherein:
increasing the respective likelihood of the pairing for a given attribute of the plurality of attributes comprises increasing the respective likelihood by a first value or percentage; and decreasing the respective likelihood of the pairing for the given attribute comprises decreasing the respective likelihood by a second value or percentage greater than the first value or percentage.

* * * * *